(12) United States Patent
Lavoie et al.

(10) Patent No.: US 10,421,490 B2
(45) Date of Patent: Sep. 24, 2019

(54) HANDWHEEL OBSTRUCTION DETECTION AND INERTIA COMPENSATION

(71) Applicant: Ford Global Technologies, LLC, Dearborn, MI (US)

(72) Inventors: Erick Michael Lavoie, Dearborn, MI (US); Darrel Alan Recker, Ypsilanti, MI (US); Michael Richard Johnson, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 15/595,038

(22) Filed: May 15, 2017

(65) Prior Publication Data

US 2017/0247053 A1    Aug. 31, 2017

Related U.S. Application Data

(63) Continuation of application No. 14/667,855, filed on Mar. 25, 2015, now Pat. No. 9,751,558.

(51) Int. Cl.
*B62D 13/06*    (2006.01)
*B62D 5/04*    (2006.01)
(Continued)

(52) U.S. Cl.
CPC .............. *B62D 13/06* (2013.01); *B62D 1/04* (2013.01); *B62D 5/0463* (2013.01);
(Continued)

(58) Field of Classification Search
CPC .... B62D 15/00; B62D 15/02; B62D 15/0205; B62D 15/021; B62D 15/0215;
(Continued)

(56) References Cited

U.S. PATENT DOCUMENTS 5,919,241 A    7/1999    Bolourchi et al.
6,122,579 A    9/2000    Collier-Hallman et al.
(Continued)

FOREIGN PATENT DOCUMENTS

EP    0842841 B1    5/2002
EP    1006042 B1    4/2006
(Continued)

OTHER PUBLICATIONS

Sh.Azadi et al., "Automatic Parking of an Articulated Vehicle Using ANFIS," Global Journal of Science, Engineering and Technology, GJSET Publishing, 2013, Issue 14, 2013, pp. 93-104.
(Continued)

*Primary Examiner* — Thomas G Black
*Assistant Examiner* — Sara J Lewandroski
(74) *Attorney, Agent, or Firm* — Raymond Coppiellie; Price Heneveld LLP

(57) ABSTRACT

A vehicle steering system includes a first sensor sensing a pinion angle of a handwheel and a second sensor sensing a torsion bar windup angle. An autonomous steering module generates a steering command having an input torque signal. A steering angle controller is configured to determine a filtered handwheel acceleration based on the pinion angle and the windup angle. The steering angle controller also determines an offset torque based on the filtered handwheel acceleration. Further, the steering angle controller applies the offset torque to the input torque signal to define a refined torque signal that compensates for inertia and off-center mass of the handwheel.

18 Claims, 16 Drawing Sheets

(51) Int. Cl.
*B62D 1/04* (2006.01)
*B62D 15/02* (2006.01)
*B62D 6/10* (2006.01)
*B62D 5/00* (2006.01)

(52) U.S. Cl.
CPC ............. *B62D 5/0481* (2013.01); *B62D 6/10* (2013.01); *B62D 15/0285* (2013.01); *B62D 5/00* (2013.01)

(58) Field of Classification Search
CPC ............ B62D 15/022; B62D 15/0225; B62D 15/023; B62D 15/0235; B62D 15/024; B62D 15/025; B62D 15/0285; B62D 1/04; B62D 1/16; B62D 1/163; B62D 5/00; B62D 5/003; B62D 5/005; B62D 5/006; B62D 5/0457; B62D 5/046; B62D 5/0463; B62D 5/0481; B62D 5/0484; B62D 6/00; B62D 6/002; B62D 6/003; B62D 6/008; B62D 6/04; B62D 6/08; B62D 6/10; B62D 13/00; B62D 13/005; B62D 13/02; B62D 13/025; B62D 13/04; B62D 13/06; G01L 5/22; G01L 5/221
See application file for complete search history.

(56) References Cited

U.S. PATENT DOCUMENTS

| | | | |
|---|---|---|---|
| 6,161,068 | A | 12/2000 | Kurischige et al. |
| 6,360,151 | B1 | 3/2002 | Suzuki et al. |
| 6,370,045 | B1 | 4/2002 | Philiips |
| 6,389,342 | B1 * | 5/2002 | Kanda ................ B62D 5/006 180/443 |
| 6,424,895 | B1 | 7/2002 | Shimizu et al. |
| 6,631,781 | B2 | 10/2003 | Williams et al. |
| 7,039,504 | B2 | 5/2006 | Tanaka et al. |
| 7,225,891 | B2 | 6/2007 | Gehring et al. |
| 7,546,191 | B2 | 6/2009 | Lin et al. |
| 7,706,944 | B2 | 4/2010 | Tanaka et al. |
| 7,777,615 | B2 | 8/2010 | Okuda et al. |
| 7,813,855 | B2 | 10/2010 | Watanabe et al. |
| 8,020,657 | B2 | 9/2011 | Allard et al. |
| 8,139,109 | B2 | 3/2012 | Schmiedel et al. |
| 8,169,341 | B2 | 5/2012 | Toledo et al. |
| 8,290,657 | B2 | 10/2012 | Lavoie |
| 8,319,614 | B2 | 11/2012 | Takano |
| 8,374,749 | B2 | 2/2013 | Tanaka |
| 8,406,956 | B2 * | 3/2013 | Wey .................. B62D 6/00 180/443 |
| 8,464,829 | B2 * | 6/2013 | Von Tardy-Tuch ......................... B62D 5/0466 180/443 |
| 8,498,770 | B2 | 7/2013 | Takano |
| 8,521,364 | B2 | 8/2013 | Hueger et al. |
| 8,571,758 | B2 | 10/2013 | Klier et al. |
| 8,645,015 | B2 | 2/2014 | Oetiker et al. |
| 8,823,796 | B2 | 9/2014 | Shen et al. |
| 8,825,221 | B2 | 9/2014 | Hueger et al. |
| 8,948,990 | B2 | 2/2015 | Kobayashi et al. |
| 8,957,786 | B2 | 2/2015 | Stempnik et al. |
| 9,043,083 | B2 | 5/2015 | Kadowaki et al. |
| 9,102,271 | B2 | 8/2015 | Trombley et al. |
| 9,132,856 | B2 | 9/2015 | Shepard |
| 9,174,672 | B2 | 11/2015 | Zeng et al. |
| 9,229,453 | B1 | 1/2016 | Lee |
| 9,238,483 | B2 | 1/2016 | Hafner et al. |
| 9,400,897 | B2 | 7/2016 | Bruening et al. |
| 9,429,943 | B2 | 8/2016 | Wilson et al. |
| 9,464,913 | B2 | 10/2016 | Brown et al. |
| 9,520,063 | B2 | 12/2016 | Noh |
| 9,751,558 | B2 * | 9/2017 | Lavoie ................ B62D 6/10 |
| 9,836,060 | B2 | 12/2017 | Ghneim et al. |
| 9,840,278 | B2 | 12/2017 | Lavoie et al. |
| 2006/0190147 | A1 | 8/2006 | Lee et al. |
| 2006/0229782 | A1 * | 10/2006 | Deng .................. B62D 6/003 701/42 |
| 2007/0057861 | A1 | 3/2007 | Sakakibara et al. |
| 2009/0222202 | A1 | 9/2009 | Kato |
| 2010/0204889 | A1 * | 8/2010 | Watanabe ............ B62D 5/0463 701/42 |
| 2012/0283909 | A1 | 11/2012 | Dix |
| 2012/0316732 | A1 | 12/2012 | Auer |
| 2013/0006472 | A1 * | 1/2013 | McClain ............... B62D 13/06 701/41 |
| 2013/0103246 | A1 | 4/2013 | Staack |
| 2013/0120161 | A1 | 5/2013 | Wakabayashi et al. |
| 2013/0229524 | A1 | 9/2013 | Vovkushevsky et al. |
| 2013/0238193 | A1 | 9/2013 | Bolourchi et al. |
| 2014/0085472 | A1 | 3/2014 | Lu et al. |
| 2014/0121883 | A1 | 5/2014 | Shen et al. |
| 2014/0121930 | A1 | 5/2014 | Allexi et al. |
| 2014/0188344 | A1 | 7/2014 | Lavoie |
| 2014/0244095 | A1 | 8/2014 | Choi et al. |
| 2015/0012202 | A1 | 1/2015 | Moore et al. |
| 2015/0025732 | A1 | 1/2015 | Min et al. |
| 2015/0077557 | A1 | 3/2015 | Han et al. |
| 2015/0158524 | A1 | 6/2015 | Lee et al. |
| 2015/0191200 | A1 * | 7/2015 | Tsubaki ............. B62D 15/0285 701/42 |
| 2015/0251602 | A1 | 9/2015 | Baur et al. |
| 2015/0259007 | A1 * | 9/2015 | Di Cairano .......... B62D 15/025 701/41 |
| 2015/0274202 | A1 | 10/2015 | Tsunoda et al. |
| 2015/0369613 | A1 | 12/2015 | Stadler |
| 2016/0059888 | A1 * | 3/2016 | Bradley .................. B60T 7/22 701/41 |
| 2016/0137221 | A1 | 5/2016 | Mose et al. |
| 2016/0207526 | A1 | 7/2016 | Franz et al. |
| 2016/0229452 | A1 | 8/2016 | Lavoie et al. |
| 2016/0251027 | A1 | 9/2016 | Farrelly |
| 2016/0251028 | A1 | 9/2016 | Tsubaki |
| 2016/0304088 | A1 | 10/2016 | Barth |
| 2016/0304122 | A1 | 10/2016 | Herzog et al. |
| 2016/0320477 | A1 | 11/2016 | Heimberger |
| 2017/0217479 | A1 * | 8/2017 | Tsubaki ............... B62D 5/0412 |

FOREIGN PATENT DOCUMENTS

| | | | | |
|---|---|---|---|---|
| EP | 2213546 | A1 * | 8/2010 | ............... B62D 1/28 |
| EP | 2213546 | A1 | 8/2010 | |
| GB | 2496298 | A | 5/2013 | |
| JP | 649063 | A | 1/1989 | |
| JP | 2002337717 | A | 11/2002 | |
| JP | 2003261053 | A | 9/2003 | |
| JP | 2009113512 | A | 5/2009 | |
| KR | 20110114897 | A | 4/2010 | |
| KR | 1020140004411 | A | 1/2014 | |
| KR | 1020150038776 | A1 | 4/2015 | |
| WO | 2006021487 | A1 | 3/2006 | |
| WO | WO-2006021487 | A1 * | 3/2006 | ........... B62D 5/0463 |

OTHER PUBLICATIONS

Cuesta et al., "Intelligent System for Parallel Parking of Cars and Tractor-Trailers," Intelligent Mobile Robot Navigation, STAR 16, Springer-Verlag Berlin Heidelberg 2016, pp. 159-188.

* cited by examiner

HANDWHEEL OBSTRUCTION DETECTION AND INERTIA COMPENSATION

CROSS-REFERENCE TO RELATED APPLICATION

This application is a continuation of U.S. patent application Ser. No. 14/667,855 filed Mar. 25, 2015, now U.S. Pat. No. 9,751,558 entitled "HANDWHEEL OBSTRUCTION DETECTION AND INERTIA COMPENSATION." The aforementioned related application is hereby incorporated by reference.

FIELD OF THE INVENTION

The disclosure made herein relates generally to driver assist and active safety technologies in vehicles, and more particularly to steering angle control that generates a torque signal that compensates for inertia and off-center mass of the handwheel.

BACKGROUND OF THE INVENTION

Reversing a vehicle while towing a trailer can be challenging for many drivers, particularly for drivers that drive with a trailer on an infrequent basis or with various types of trailers. Backing a vehicle with an attached trailer can be difficult as steering inputs are required that are opposite to steering inputs when backing the vehicle without a trailer attached to the vehicle, such that small errors in steering the vehicle are amplified by the trailer. These errors can cause the trailer to quickly depart from a desired path and may cause difficulties controlling the vehicle in a manner that limits the potential for a jackknife condition to occur. Like other autonomous and semi-autonomous vehicle systems, a trailer backup assist system may reduce difficulties experienced by the driver performing such a maneuver. These autonomous and semi-autonomous vehicle systems may provide commands to an electronic steering controller that automatically operates steered wheels of the vehicle. The accurate operation of the electronic steering controller is critical to make autonomous and semi-autonomous vehicle systems perform in a robust manner, so as to be trusted and relied upon by an operator of the vehicle.

SUMMARY OF THE INVENTION

According to one aspect of the present invention, a vehicle steering system includes a first sensor sensing a pinion angle of a handwheel and a second sensor sensing a torsion bar windup angle. An autonomous steering module generates a steering command having an input torque signal. A steering angle controller is configured to determine a filtered handwheel acceleration based on the pinion angle and the windup angle. The steering angle controller also determines an offset torque based on the filtered handwheel acceleration. Further, the steering angle controller applies the offset torque to the input torque signal to define a refined torque signal that compensates for inertia and off-center mass of the handwheel.

According to another aspect of the present invention, a vehicle steering system includes a sensor that senses a handwheel angle. An autonomous steering module generates an input torque signal. A steering angle controller determines a filtered handwheel acceleration based on the handwheel angle, determines an offset torque based on the filtered handwheel acceleration, and generates a compensated torque signal based on the offset torque and the input torque signal.

According to yet another aspect of the present invention, a method includes a step of sensing an angle of a handwheel. The method also includes a step of generating a steering command having an input torque signal. In addition, the method includes steps of determining a filtered handwheel acceleration based on the angle and determining an offset torque based on the filtered handwheel acceleration. Further, the method includes a step of generating a filtered compensated torque signal based on the offset torque and the input torque signal to compensate for inertia and off-center mass of the handwheel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
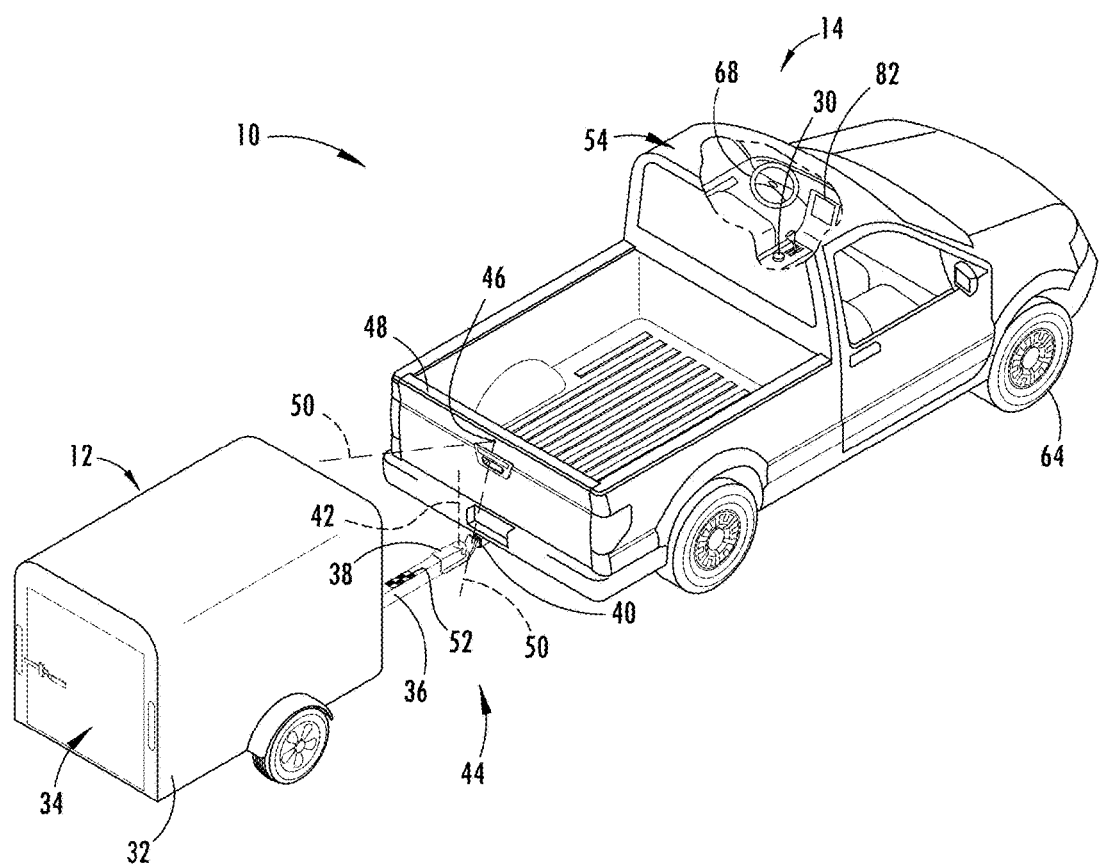
FIG. 1 is a top perspective view of a vehicle attached to a trailer with one embodiment of a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-13, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature 26 of the backing path as a driver uses the accelerator and brake pedals to control the reversing speed of the vehicle 14. To monitor the position of the trailer 12 relative to the vehicle 14, the trailer backup assist system 10 may include a sensor or sensor system 16 that senses or otherwise determines a hitch angle γ between the trailer 12 and the vehicle 14. In one embodiment, the sensor system 16 may include a hitch angle sensor 44, such as a vision-based sensor that employs a camera 46 on the vehicle 14 to monitor a target 52 on the trailer 12 to measure the hitch angle γ. The vehicle 14 is autonomously steered with a steering system 62 that controls a steering angle δ of the front wheels of the vehicle 14 within physical angle limits 20 of the steering system 62 and any adaptive angle limits 23, which may be generated based on a reversing speed of the vehicle 14, the hitch angle γ, and a maximum hitch angle rate. Restricting the steering command to the adaptive angle limit 23 may prevent the steering system 62 from exceeding the maximum hitch angle rate, and thereby avoid undesired hitch angle conditions outside the desired curvature 26, such as a jackknife condition.

Referring generally to FIGS. 13-20B, the steering system 62 is further illustrated and defined to operate multiple autonomous steering modules, including the trailer backup assist system 10 and other autonomous steering modules, such as an active park assist system 202. To arbitrate and control the steering system 62, an angle-based steering control routine 206 of the steering angle controller 200 is configured to receive the steering angle commands from multiple steering modules, and when multiple steering angle commands are present, generate a refined steering angle command for the steering angle controller 200 to operate the steered wheels 64 of the vehicle. The steering angle controller 200 receives the multiple steering angle commands and generates the refined steering angle command for steering the vehicle based on acceptable steering column torque conditions for the respective steering module. As such, the refined steering angle command may be substantially equal to one of the steering angle commands when the other potential steering angle commands have transitioned to an inactive arbitration state. To accurately control the steering angle with the refined steering angle command, the steering angle controller 200 may also process a torque signal compensation routine that determines a filtered handwheel acceleration based on the handwheel angle, determines an offset torque based on the filtered handwheel acceleration and mass properties, and ultimately generates a compensated torque signal based on the offset torque and the input torque signal. The compensated torque signal compensates for inertia and off-center mass of the handwheel, whereby a high torque value associated with a sudden change in direction of the pinion angle is reduced in the refined torque signal to prevent the refined torque signal from errantly exceeding a torque threshold, which is indicative of an object obstructing rotation of the handwheel and causes the respective autonomous steering module to be placed in an inactive arbitration state, such as a fault condition.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a trailer yaw rate sensor, a proximity sensor, an ultrasonic sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

Figure 2:
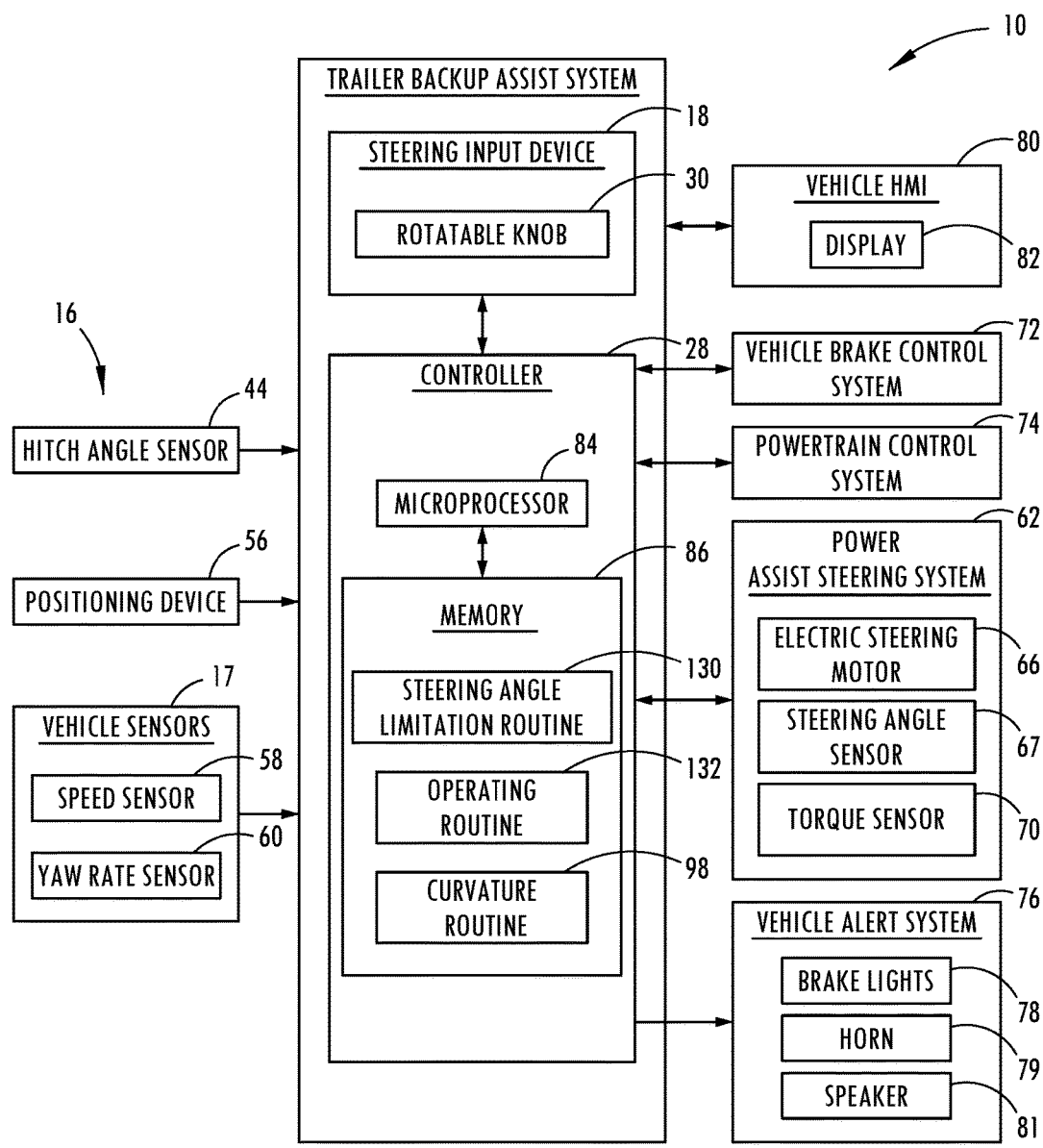
FIG. 2 is a block diagram illustrating one embodiment of the trailer backup assist system having a steering input device and a controller in communication with a steering system.

With reference to the embodiment of the trailer backup assist system 10 shown in FIG. 2, the hitch angle sensor 44 is illustrated generally as a means to estimate the hitch angle γ and communicate with the trailer backup assist system 10. The illustrated embodiment of the trailer backup assist system 10 also receives vehicle and trailer status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to supplement the hitch angle sensor 44 in estimating hitch angle γ or an indicator thereof, such as a range of hitch angles.

As also shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 generally reacts in accordance with the desired curvature 26 of the trailer 12. In the illustrated embodiment, the steering system 62 is an electric power-assisted steering (EPAS) system that includes an electric steering motor 66 for turning the steered wheels 64 (FIG. 1) to a steering angle based on a steering command, whereby the steering angle may be sensed by a steering angle sensor 67 of the steering system 62. Due to the size of wheel wells and tire dimensions, among other components of the vehicle 14, the steering system 62 may be physically constrained in the amount the steered wheels 64 may be freely turned by the electric steering motor 66, which thereby defines the physical steering angle limits 20 of the steering system 62. For instance, the physical steering angle limits 20 may be determined by the minimum turning radius achievable by the vehicle 14. Accordingly, the physical steering angle limits 20 may vary between types and configurations of different vehicles. In addition, the steering system 62 may also be naturally constrained by the maximum controllable steering angle rate of the steering system 62, which may be determined by the capacity of the electric steering motor 66, among other associated components of the steering system 62. The controllable rate of adjusting the steering angle δ with the steering system 62 may be used by the trailer backup assist system 10 to regulate the steering commands for preventing the resulting hitch angle conditions from deviating outside the desired curvature 26 of the trailer 12.

With further reference to FIG. 2, the steering command may be provided by the trailer backup assist system 10 for autonomously steering during a backup maneuver and may alternatively be provided by other vehicle steering assistance systems or modules. It is also contemplated that a steering command may be provided manually via a rotational position (e.g., steering wheel angle) of a steering wheel or handwheel 68 (FIG. 1) for manual operation of the vehicle. In the illustrated embodiment, the handwheel 68 of the vehicle 14 is mechanically coupled with the steered wheels 64 of the vehicle 14, such that the handwheel 68 moves in concert with steered wheels 64, preventing manual intervention with the handwheel 68 during autonomous steering. More specifically, a torque sensor 70 is provided on the power assist steering system 62 that senses torque on the handwheel 68 that is not expected from autonomous control of the handwheel 68 and therefore indicative of manual intervention, whereby the trailer backup assist system 10 may alert the driver to discontinue manual intervention with the handwheel 68 and/or discontinue autonomous steering.

In additional embodiments, some vehicles have a power assist steering system 62 that allows a handwheel 68 to be partially decoupled from movement of the steered wheels 64 of such a vehicle. Accordingly, the handwheel 68 can be rotated independent of the manner in which the power assist steering system 62 of the vehicle controls the steered wheels 64 (e.g., autonomous steering as commanded by the trailer backup assist system 10). As such, in these types of vehicles where the handwheel 68 can be selectively decoupled from the steered wheels 64 to allow independent operation thereof, the handwheel 68 may be used as a steering input device 18 for the trailer backup assist system 10, as disclosed in greater detail herein.

Referring again to the embodiment illustrated in FIG. 2, the power assist steering system 62 may provide the controller 28 of the trailer backup assist system 10 with information relating to a rotational position of steered wheels 64 of the vehicle 14, such as the steering angle δ of the steered wheels 64. The controller 28 in the illustrated embodiment processes the current steering angle δ, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, in such an alternative embodiment the power assist steering system 62 may include an algorithm for generating vehicle steering information and commands as a function of all or a portion of information received from the steering input device 18, the hitch angle sensor 44, the power assist steering system 62, a vehicle brake control system 72, a powertrain control system 74, and the other vehicle sensors and devices.

As also illustrated in FIG. 2, the vehicle brake control system 72, also referred to as the braking system, may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For instance, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is also disclosed herein that the trailer backup assist system 10 can issue an alert signal corresponding to a notification of an actual, impending, and/or anticipated unacceptable trailer backup condition. Further, in one embodiment, the braking system 72 may be controlled with the trailer backup assist system 10 to autonomously limit speed of the vehicle 14 during a backing maneuver for the maximum hitch angle rate generated by the trailer backup assist system 10 to remain substantially constant, such that the vehicle 14 is limited to reversing at lower speeds as the hitch angle increases. The maximum hitch angle rate remaining substantially constant may also allow the adaptive steering angle limits 23 to not further restrict adjustments to the steering angle as the hitch angle increases.

The powertrain control system 74, as shown in the embodiment illustrated in FIG. 2, may similarly interact with the trailer backup assist system 10 for regulating speed and acceleration of the vehicle 14 during backing of the trailer 12. As mentioned above, regulation of the speed of the vehicle 14 may be used to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18, according to one embodiment, may include a movable control input device separate from the handwheel for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the hitch angle sensor 44, the steering input device 18, the steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a steering angle limitation routine 130, an operating routine 132, and a curvature routine 98. It should be appreciated that the controller 28 may be a stand-alone dedicated controller or may be a shared controller integrated with other control functions, such as integrated with the sensor system 16, the steering system 62, and other conceivable onboard or offboard vehicle control systems.

Figure 3:
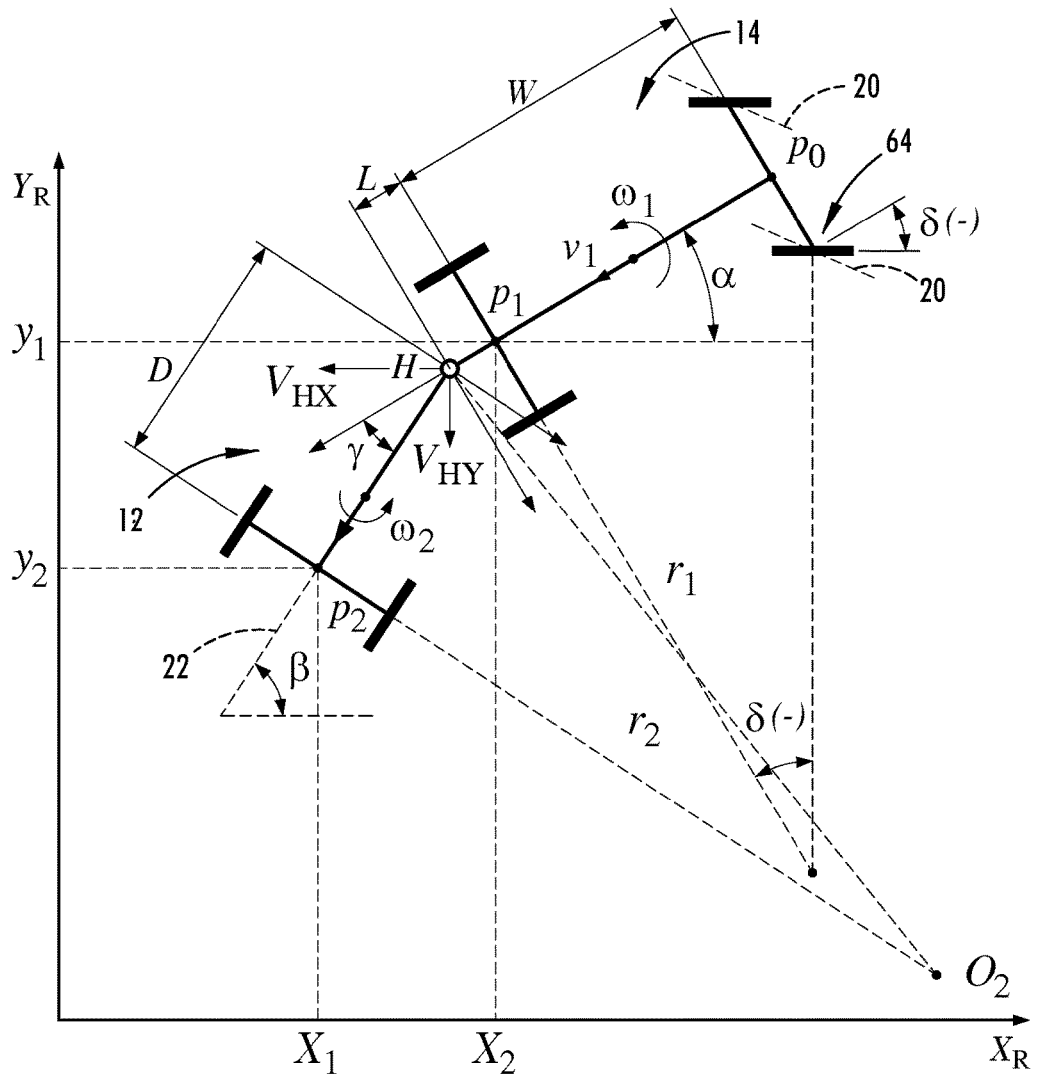
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12. The kinematic relationship can be usefully for various routines of a trailer backup assist system 10, including for use by a curvature routine 98 of the controller 28 in one embodiment. To determine such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

$\delta$: steering angle at steered front wheels of the vehicle;
$\alpha$: yaw angle of the vehicle;
$\beta$: yaw angle of the trailer;
$\gamma$: hitch angle ($\gamma = \beta - \alpha$);
W: wheel base of the vehicle;
L: length between hitch point and rear axle of the vehicle;

D: distance between hitch point and axle of the trailer or effective axle for a multiple axle trailer (axle length may be an equivalent); and
$r_2$: curvature radius for the trailer.

One embodiment of a kinematic relationship based on trailer path radius of curvature $r_2$ at the midpoint of an axle of the trailer 12, steering angle $\delta$ of the steered wheels 64 of the vehicle 14, and the hitch angle $\gamma$ can be expressed in the equation provided below. As such, if the hitch angle $\gamma$ is provided, the trailer path curvature $\kappa_2$ can be controlled based on regulating the steering angle $\delta$ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle $\delta$ as a function of trailer path curvature $\kappa_2$ and hitch angle $\gamma$.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Through the use of the equation for providing steering angle, a corresponding steering command can be generated by the curvature routine 98 for controlling the power assist steering system 62 of the vehicle 14. Accordingly, for a particular vehicle and trailer combination, certain parameters (e.g., D, W, and L) of the kinematic relationship are constant and assumed known, while other parameters (e.g. speed of the vehicle and hitch angle) are sensed or otherwise determined by the system. V is the vehicle longitudinal speed and g is the acceleration due to gravity. K is a speed dependent parameter which when set to zero makes the calculation of steering angle independent of vehicle speed. Trailer path curvature $\kappa_2$ can be determined from the driver input via the steering input device 18. However, constant, vehicle-specific parameters of the kinematic relationship can be predefined in an electronic control system of the vehicle 14 and constant, trailer-specific parameters of the kinematic relationship can be inputted by a driver of the vehicle 14, determined from sensed trailer behavior in response to vehicle steering commands, or otherwise determined from signals provided by the trailer 12. For instance, the known trailer parameters can be provided by the user obtaining the parameters, such as by taking measurements with a tape measure, and manually entering the parameters into memory of the system (e.g. via the HMI 80 of the vehicle). In an additional embodiment, the known parameters of the trailer 12 (e.g. trailer length D, wheel base of the trailer, and trailer height) and any other trailer data (e.g. the presence of trailer brakes, and the trailer load capabilities) may be automatically obtained by the user and may be automatically transmitted to the trailer backup assist system 10 by a user scanning a unique identifier on the attached trailer 12. Such a unique identifier may include a radio frequency identifier (RFID) chip, a quick response (QR) code, or similar arrangement on the trailer that can be interpreted and decoded to recover the data, often by a smartphone device with wireless internet connectivity. Moreover, an electronic camera on a smartphone could view and decode a QR code sticker permanently attached to the trailer 12 to determine the unique trailer identifier, such as a serial number, and then wirelessly contact a related trailer database on the internet or a private server to download the trailer parameters associated with the unique trailer identifier to the phone and/or the trailer backup assist system. In the event that the trailer database is not able to provide the necessary parameters of the trailer, the user could also apply a QR code sticker containing a unique identifier to the trailer and manually input the trailer parameters to associate the QR code with the trailer in the future. It is also contemplated that other embodiments may use alternative trailer detection techniques to automatically determine the trailer parameters.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption is that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned herein generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
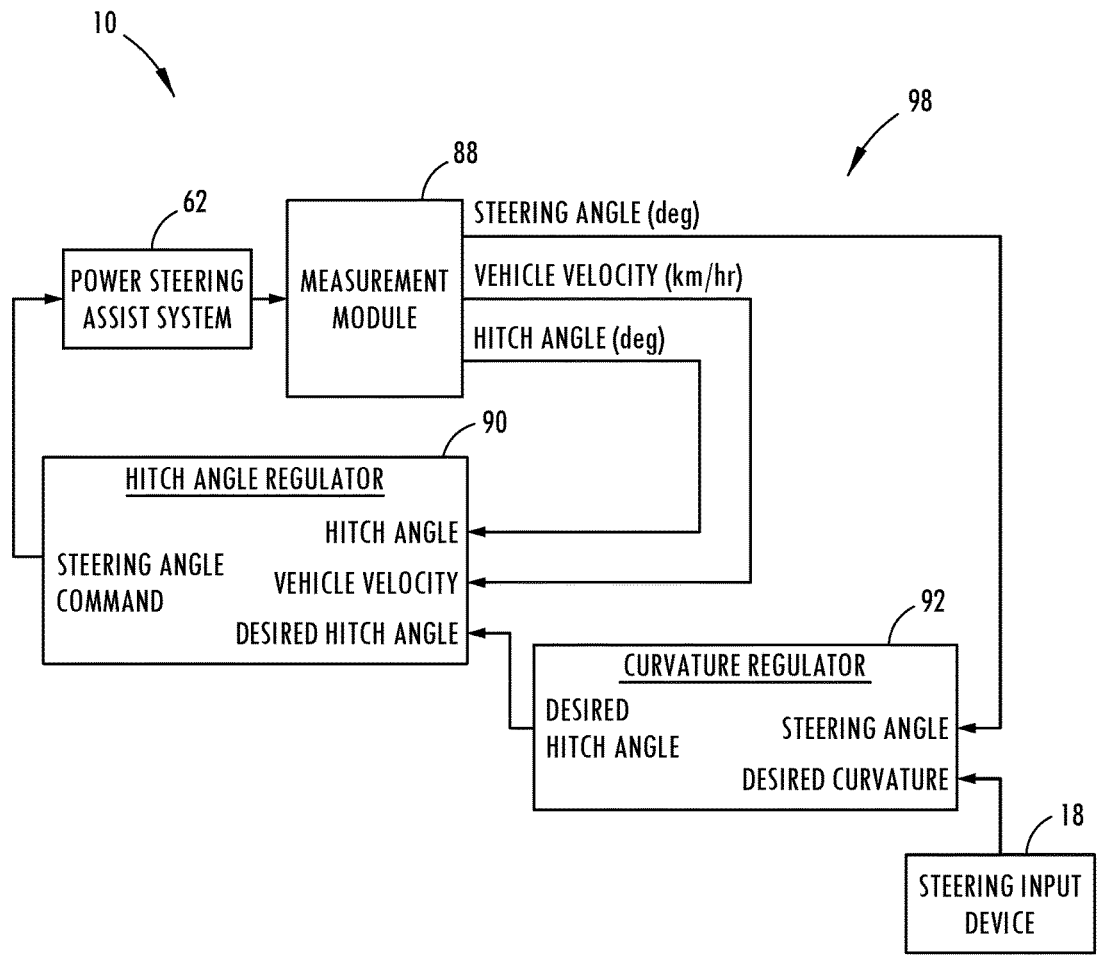
FIG. 4 is a schematic block diagram illustrating portions of a curvature routine of the controller, according to an additional embodiment, and other components of the trailer backup assist system, according to such an embodiment.

Yet another embodiment of the curvature routine 98 of the trailer backup assist system 10 is illustrated in FIG. 4, which depicts the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 5:
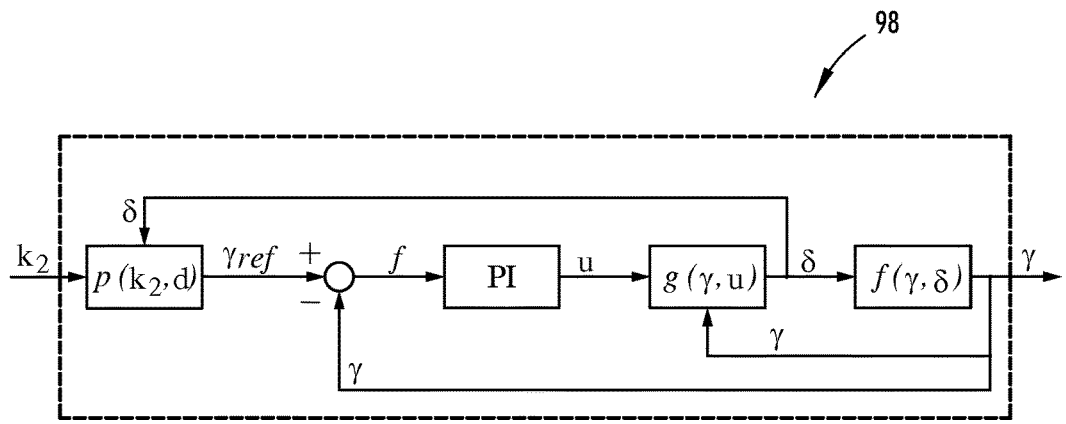
FIG. 5 is schematic block diagram of the curvature routine of FIG. 4, showing the feedback architecture and signal flow of the controller, according to such an embodiment.

As also shown in FIG. 5, the embodiment of the curvature routine 98 shown in FIG. 4 is illustrated in a control system block diagram. Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 DW + L\tan(\delta)}{\kappa_2 DL\tan(\delta) - W}\right)$$

Where, $\kappa_2$ represents the desired curvature of the trailer 12 or $1/r_2$ as shown in FIG. 3;

δ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

With further reference to FIG. 5, the output hitch angle of $p(\kappa_2, \delta)$ is provided as the reference signal, $\gamma_{ref}$, for the remainder of the control system, although the steering angle δ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(\frac{v}{D}\sin(\gamma) - u\right)\right)$$

As also shown in FIG. 5, the feedback control law, g(u, γ, v), is implemented with a proportional integral (PI) controller, whereby the integral portion substantially eliminates steady-state tracking error. More specifically, the control system illustrated in FIG. 5B may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller or otherwise determined by the trailer backup assist system 10, as disclosed in greater detail herein.

Figure 6:
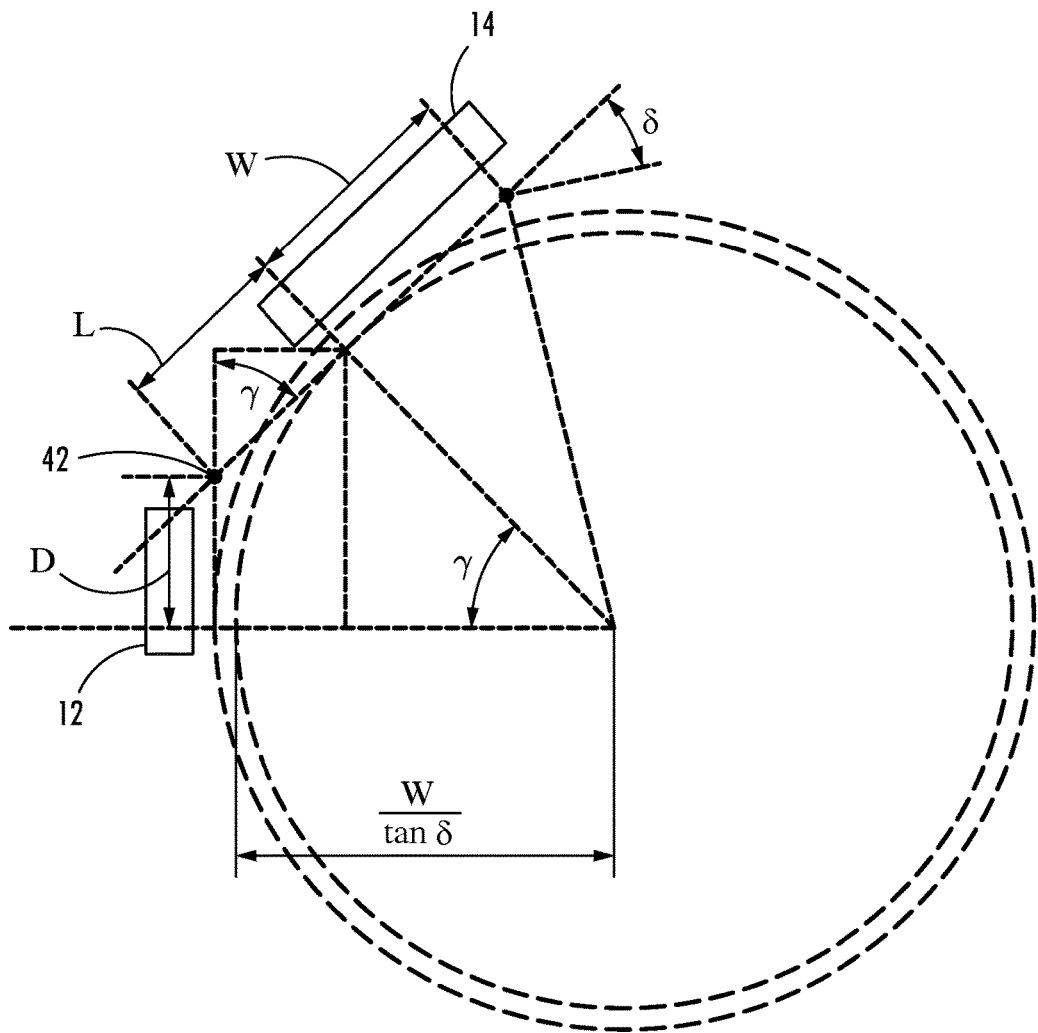
FIG. 6 is a schematic diagram showing a relationship between a hitch angle and a steering angle of the vehicle as it relates to curvature of the trailer and a jackknife angle.

Referring now to FIG. 6, in the illustrated embodiments of the disclosed subject matter, it may be desirable to limit the potential for the vehicle 14 and the trailer 12 to attain a jackknife angle (i.e., the vehicle/trailer system achieving a jackknife condition). A jackknife angle γ(j) refers to a hitch angle γ that while backing cannot be overcome by the maximum steering input for a vehicle such as, for example, the steered front wheels of the vehicle 14 being moved a maximum rate of steering angle change to a maximum steered angle δ or physical steering angle limit 20. The jackknife angle γ(j) is a function of a maximum wheel angle (i.e. a physical steering angle limit 20) for the steered wheels of the vehicle 14, the wheel base W of the vehicle 14, the distance L between hitch point and the rear axle of the vehicle 14, and the length D between the hitch point and the axle of the trailer 12 or the effective axle when the trailer 12 has multiple axles. When the hitch angle γ for the vehicle 14 and the trailer 12 achieves or exceeds the jackknife angle γ(j), the vehicle 14 may be pulled forward to reduce the hitch angle γ.

A kinematic model representation of the vehicle 14 and the trailer 12 can also be used to determine a jackknife angle for the vehicle-trailer combination. Accordingly, with reference to FIGS. 3 and 6, the physical steering angle limit 20 for the steered front wheels 64 requires that the hitch angle γ cannot exceed the jackknife angle γ(j), which is also referred to as a critical hitch angle γ. Thus, under the limitation that the hitch angle γ cannot exceed the jackknife angle γ(j), the jackknife angle γ(j) is the hitch angle γ that maintains a circular motion for the vehicle/trailer system when the steered wheels 64 are at a maximum steering angle δ(max) or the physical steering angle limit 20. The steering angle for circular motion with hitch angle γ is defined by the following equation.

$$\tan \delta_{max} = \frac{w \sin \gamma_{max}}{D + L \cos \gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos \overline{\gamma} = \frac{-b \pm \sqrt{b^2 - 4ac}}{2a}$$

where, $a = L^2 \tan^2 \delta(\text{max}) + W^2;$ $b = 2LD \tan^2 \delta(\text{max});$ and $c = D^2 \tan^2 \delta(\text{max}) - W^2.$ In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer curvature and/or can reduce an ability to steer the trailer 12 away from the jackknife angle.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU), such as the controller 28, that carries out trailer backup assist functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the handwheel 68 of the vehicle 14 due to the steered wheels 64 of the steering system 62 being directly coupled to the handwheel 68. Accordingly, the steering input device 18 of the trailer backup assist system 10 may be used for inputting a desired curvature 26 of the trailer 12, thereby decoupling such commands from being made at the handwheel 68 of the vehicle 14. However, additional embodiments of the trailer backup assist system 10 may have the capability to selectively decouple the handwheel 68 from movement of steerable wheels of the vehicle 14, thereby allowing the handwheel 68 to be used for commanding changes in the desired curvature 26 of a trailer 12 or otherwise selecting a desired backing path during such trailer backup assist.

Figure 7:
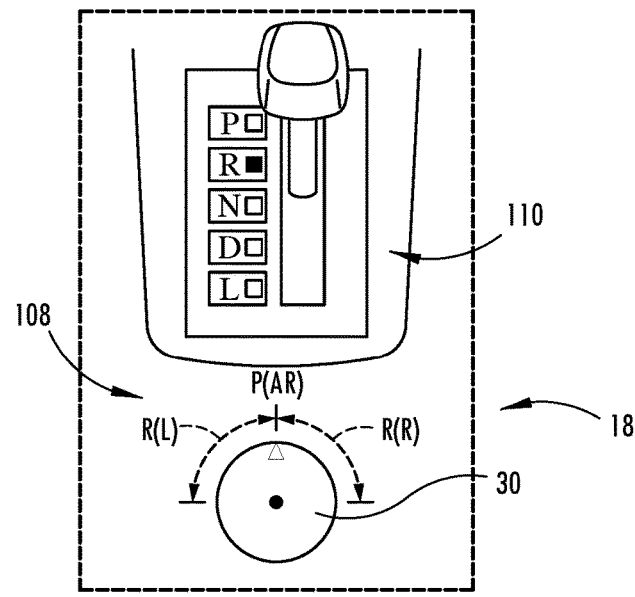
FIG. 7 is a plan view of one embodiment of a steering input device having a rotatable knob for operating the trailer backup assist system.

Referring now to FIG. 7, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 8:
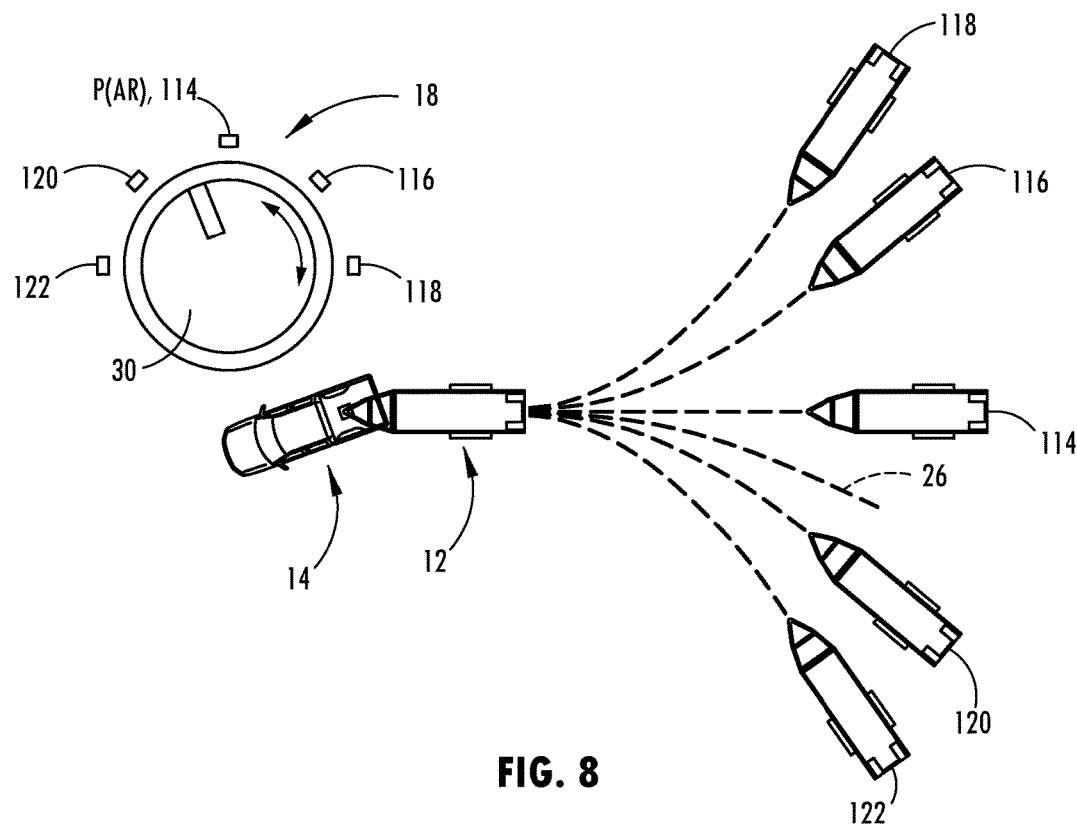
FIG. 8 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 7-8, may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may also be used to determine the desired curvature output to the controller 28. The at-rest position P(AR) of the knob corresponds to a signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 8, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 9:
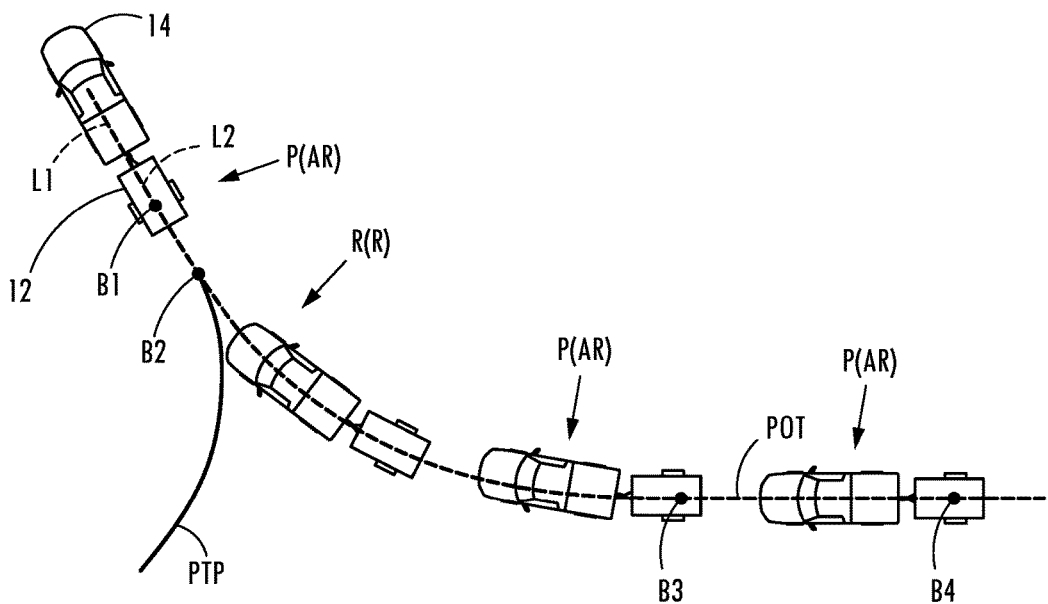
FIG. 9 is a schematic diagram showing a backup sequence of a vehicle and a trailer implementing various curvature selections with the trailer backup assist system, according to one embodiment.

Referring to FIG. 9, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In the embodiment illustrated in FIG. 9, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the necessary steering command to achieve the desired curvature 26, whereby the driver controls the throttle and brake while the trailer backup assist system 10 controls the steering angle.

Figure 10:
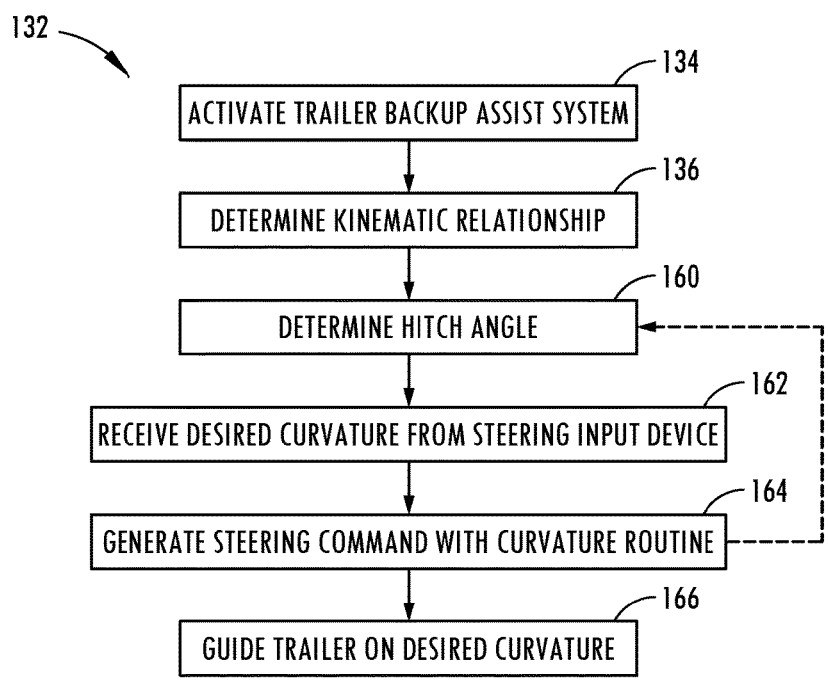
FIG. 10 is a flow diagram illustrating a method of operating a trailer backup assist system using an operating routine for steering a vehicle reversing a trailer with the desired curvature, according to one embodiment.

With reference to FIG. 10, a method of operating one embodiment of the trailer backup assist system 10 is illustrated, shown as one embodiment of the operating routine 132 (FIG. 2). At step 134, the method is initiated by the trailer backup assist system 10 being activated. It is contemplated that this may be done in a variety of ways, such a making a selection on the display 82 of the vehicle HMI 80. The next step 136 determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3 and 6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 160 to determine the current hitch angle with the hitch angle sensor 44. It is also conceivable that in some embodiments the hitch angle may be estimated additionally or alternatively with other devices, such as a sensor module having a yaw rate sensor attached to the trailer used in conjunction with a vehicle yaw rate sensor to calculate an estimate of the hitch angle. Further, it is contemplated that in additional embodiments of the trailer backup assist system 10 that the steps of determining the kinematic relationship and sensing the hitch angle γ may occur before the trailer backup assist system 10 is activated or at any other time before steering commands are generated.

Still referring to FIG. 10, at step 162, the position changes are received from the steering input device 18, such as the angular position of a secondary steering input device, such as the rotatable knob 30, for determining the desired curvature 26. With the determined desired curvature 26, at step 164, a steering command may be generated based on the desired curvature 26, correlating with the position of the steering input device 18. The steering commands generated may be generated in conjunction with the processing of the curvature routine 98 and the steering angle limitation routine 130, among other conceivable routines processed by the controller 28.

Figure 11:
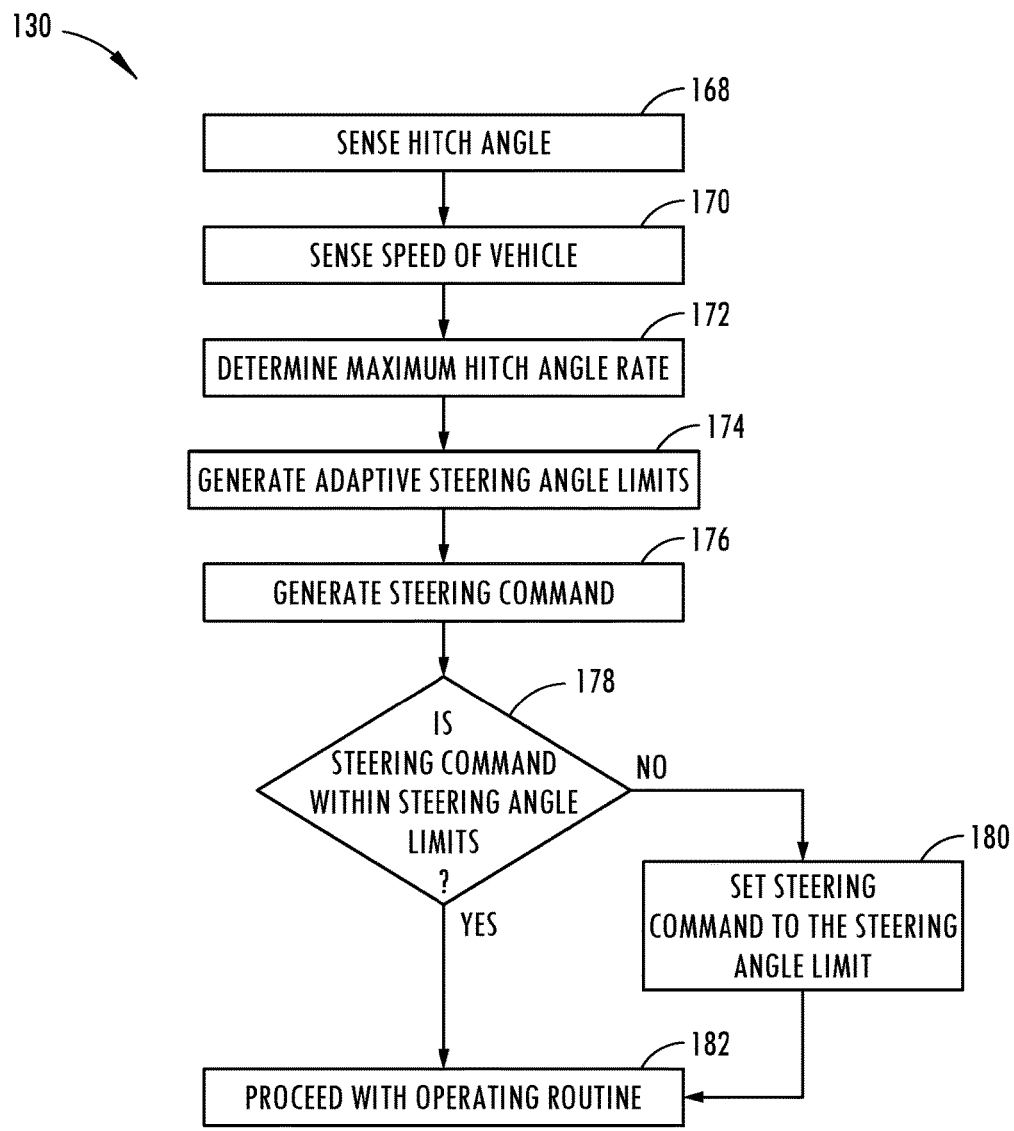
FIG. 11 is a flow diagram illustrating a method of operating a trailer backup assist system using a steering angle limitation routine, according to one embodiment.

With reference to FIG. 11, one embodiment of the steering angle limitation routine 130 is illustrated, which may be processed in parallel with the operating routine 132, although it is contemplated that the operating routine 132 may be modified in additional embodiments to incorporate the steps of the steering angle limitation routine 130, as described herein. The depicted embodiment includes the preliminary steps 168 and 170 of sensing the hitch angle γ and sensing the reversing speed of the vehicle, respectively. As mentioned above, the hitch angle γ may be previously determined at step 160 of the operating routine 132 and the speed of the vehicle 14 may be sensed with the speed sensor 58 on the vehicle, among other potential ways of the determining the hitch angle γ and the speed.

Still referring to FIG. 11, after the preliminary steps 168 and 170, the illustrated embodiment includes step 172 of determining the maximum hitch angle rate for the steering system. According to one embodiment, the maximum hitch angle rate may be preset based on a maximum controllable steering angle rate of the vehicle. As previously mentioned, the maximum controllable steering angle rate of the vehicle may be determined by the capabilities of the steering system 62 of the particular vehicle 14 and may be a default static value or may dynamically update based on operating conditions or other conceivable factors. In an additional embodiment, the maximum hitch angle rate may also be continuously regenerated and defined as a function of the speed of the vehicle 14. It is also contemplated that the maximum hitch angle rate may be additionally or alternatively determined with incorporating other variables, such as a length of the trailer 12. In additional embodiments, step 172 may be performed before the preliminary steps 168 and 170 or in conjunction with other routines of the trailer backup assist system 10.

With the continued reference to FIG. 11, at step 174 the controller 28 of the trailer backup assist system 10 may generate adaptive steering angle limits 23, which according to one embodiment may be based upon the maximum hitch angle rate, the hitch angle γ, and the reversing speed of the vehicle 14. With the adaptive steering angle limits 23 generated, the trailer backup assist system 10 may control the steering angle δ of the vehicle 14 within the adaptive steering angle 23 limits to guide the trailer on a desired backing path, preventing the steering system 62 from exceeding the maximum hitch angle rate, and thereby avoid undesired hitch angle conditions outside the desired curvature 26, such as a jackknife condition The adaptive steering angle limits 23 are typically generated within the physical angle limits 20 of the steering system 62, as the steering angle δ is inherently prevented from exceeding physical angle limits 20. The adaptive steering angle limits 23 may be continuously regenerated in increments of time based on the changes to the speed of the vehicle 14 and the hitch angle γ. In one embodiment, the adaptive steering angle limits 23 may be defined with the following equations:

$$SWA_1 = \delta_1 * GR * \frac{180}{\Pi}$$

$$SWA_2 = \delta_2 * GR * \frac{180}{\Pi}$$

Where, $$\delta_1 = \tan^{-1}\left(\frac{W}{L}\left(\frac{D}{v\cos\gamma} * c - \tan\gamma\right)\right), \text{ and}$$

$$\delta_2 = \tan^{-1}\left(\frac{W}{L}\left(-\frac{D}{v\cos\gamma} * c - \tan\gamma\right)\right).$$

Figure 12:
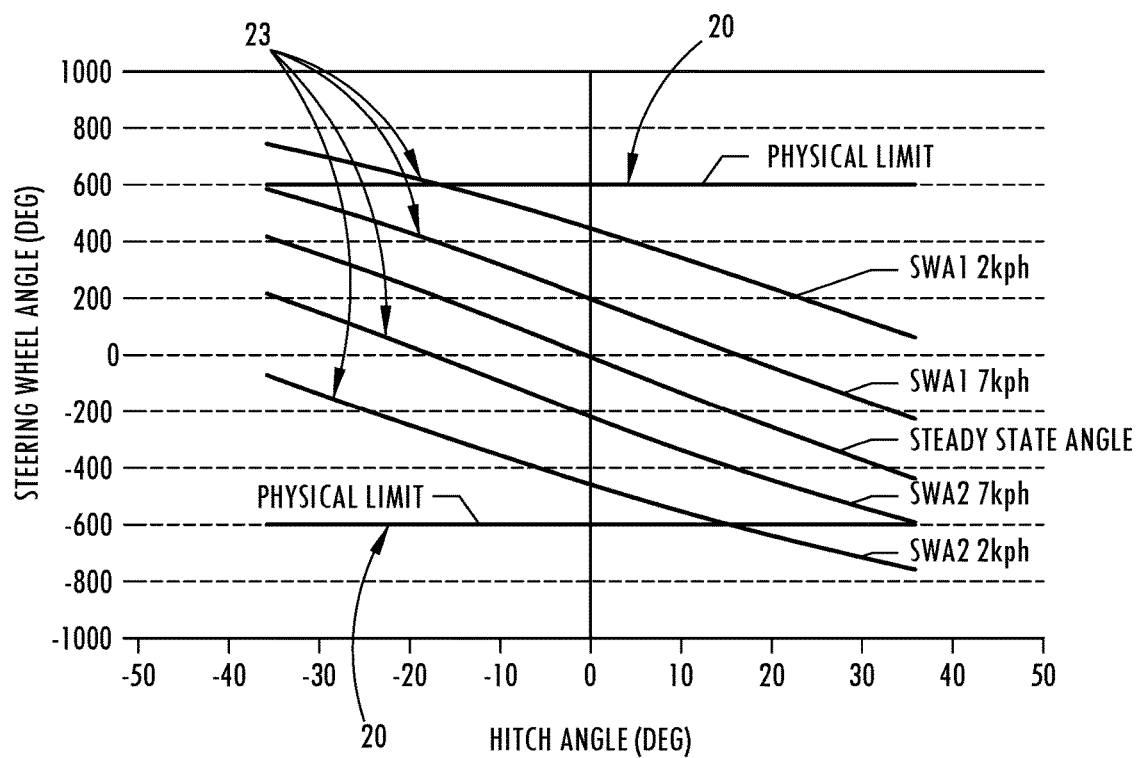
FIG. 12 is a graphical representation of the steering wheel angle relative to the hitch angle for one embodiment of a vehicle and a trailer, illustrating physical angle limits and various adaptive angle limits.

As shown in FIG. 12, the physical and adaptive steering angle limits 20, 23 are depicted for a trailer backup assist system 10 with a maximum hitch angle rate of 10 deg/s and a vehicle 14 with a wheelbase W of 3.683, a distance L from the rear axle to the hitch of 1.386, and a trailer 12 with a length D of 3.225. As shown, the adaptive steering angle limits 23 are shown for a speed of 2 kph and 7 kph.

Referring again to FIG. 11, at step 176 the controller 28 may proceed to generate a steering command based on the desired curvature 26, the sensed hitch angle γ, and the kinematic relationship. The desired steering angle of the steering command is then evaluated at step 178 to determine if it is within the physical and adaptive angle limits 20, 23. If the initially generated steering angle is outside either of the physical or adaptive angle limits 20, 23, at step 180 the most restrictive of the physical and adaptive angle limits 20, 23 that are closest to the desired steering angle will be set as the steering command. The combination of steps 178 and 180 generate a steering command within the physical and adaptive angle limits 20, 23 that guides the trailer 12 toward the desired curvature 26 and prevents the hitch angle γ from approaching a jackknife condition. More specifically, the adaptive angle limits 23 prevent the jackknife condition by only allowing the trailer 12 to be on the desired curvature 26 when the hitch angle rate is below the maximum rate determined or otherwise selected. This allows the steering angle δ to adjust with changes to the hitch angle γ, such that the rate of change of the hitch angle γ, i.e. the hitch angle rate, slows and eventually reaches zero as the vehicle 14 and the trailer 12 reach the steady state condition for the desired curvature 26, not overshooting the desired curvature 26. Further, generating the steering command within the physical and adaptive angle limits 20, 23 allows the vehicle to operate at higher speeds, while still maintaining the same hitch angle rate limits as those achieved at lower speeds. With the generated steering command, the steering angle limitation routine 130 directs at step 182 for the controller 28 to proceed with the operating routine 132.

As shown in the embodiment depicted in FIG. 10, at step 166, the steering commands are executed to guide the trailer 12 on the desired curvature 26 provided by the steering input device 18. In addition to adjusting the steering angle δ, it is contemplated that additional embodiments of the operating routine 132 may employ the braking system 72 of the vehicle 14 to autonomously limit the speed of the vehicle 14 to aid in reducing the hitch angle rate. It is also contemplated that additional embodiments may limit the speed and acceleration of the vehicle 14 and trailer 12 with other systems, such as the vehicle powertrain system 74 and/or a trailer braking system, if available.

Referring again to FIG. 12, the operational possibilities of an exemplary embodiment of the steering angle limitation routine 130 is depicted with the steering angle δ shown as the corresponding steering wheel angle. As shown, the physical steering angle limits 20 are constant for the steering system 62 of the vehicle 14 at a static steering angle defined by the operational constraints of the steering system. In contrast to the physical steering angle limits 20, the adaptive steering angle limits 23 are shown as substantially linear functions having a negative slope for the adaptive steering angle limits 23 across the potential hitch angles at two different vehicle speeds, 2 kph and 7 kph. As such, the adaptive steering angle limits 23 can been seen to decrease and further limit the potential steering angle as the hitch angle γ increases in both positive and negative directions away from the zero hitch angle. These adaptive steering angle limits 23 prevent the steering wheel angle from creating a hitch angle rate that cannot be recovered by the steering system. In some embodiments, the steering system is controllable below a threshold rate, such as a controllable steering angle rate between 300 to 600 degrees per second, that is configured to control a corresponding hitch angle rate, which may also be dependent upon the specific geometry of the trailer 12 and thereby the kinematic relationship with the vehicle 14. However, the adaptive steering angle limits 23 are greater than the physical steering angle limits 20 in the steering direction toward the zero hitch angle as the hitch angle γ increases beyond approximately 15 degrees in the illustrated embodiment. It is contemplated that in additional embodiments the physical and adaptive steering angle limits 20, 23 may be non-linear functions and alternatively configured from those illustrated herein.

Figure 13:
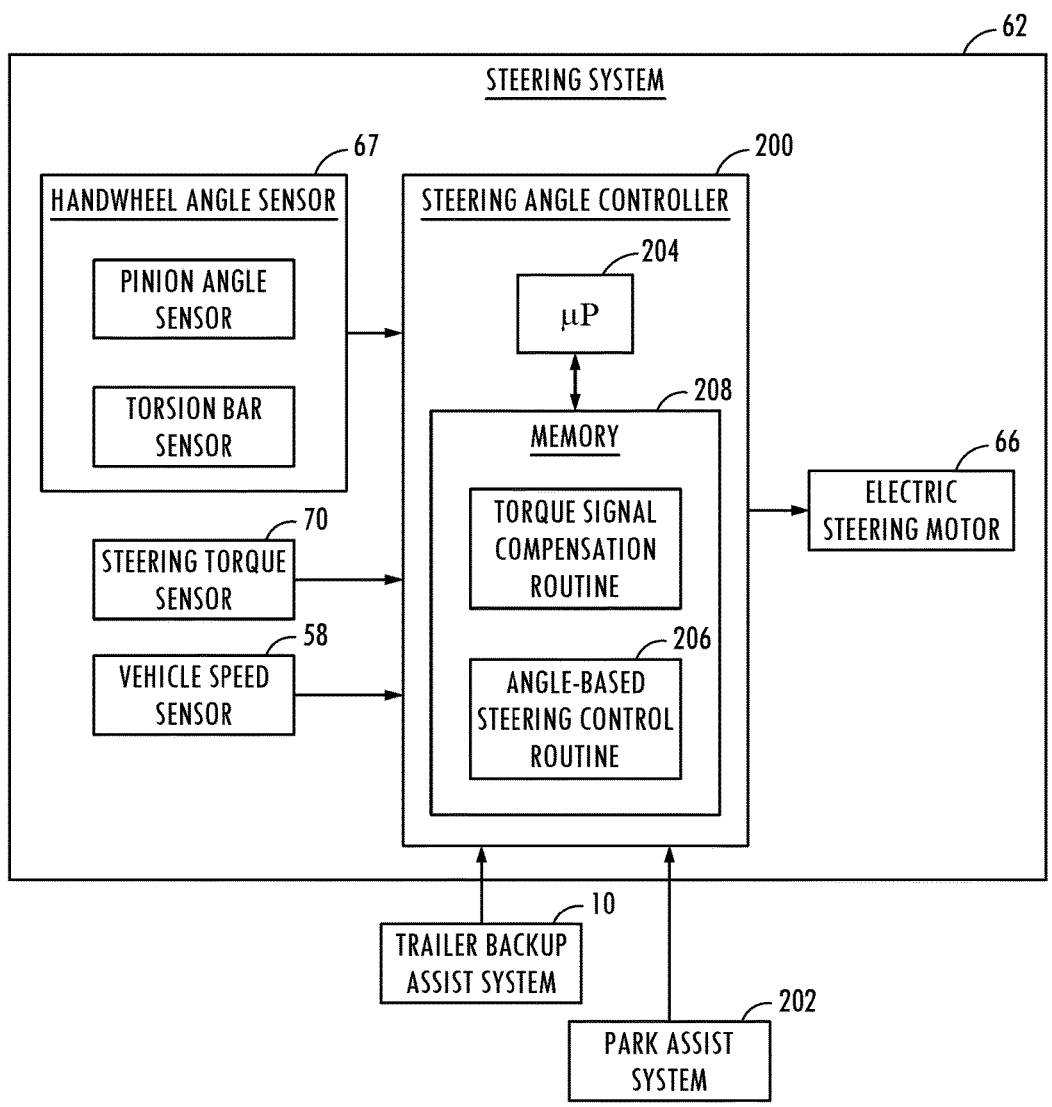
FIG. 13 is a block diagram illustrating one embodiment of the steering system having a controller in communication with the trailer backup assist system and a park assist system.

With reference to FIG. 13, a more detailed embodiment of the steering system 62 is shown identifying a steering angle controller 200 that receives signals from multiple autonomous steering modules, namely the trailer backup assist system 10 as well as a park assist system 202. The steering angle controller 200 of the illustrated embodiment of the steering system 62 receives signals from several vehicle sensors, including a steering wheel angle sensor 67, a steering torque sensor 70, and a vehicle speed sensor 58. In one embodiment, these sensor signals are transmitted over a vehicle communication network, such as a CAN bus, and received by the steering angle controller 200 in combination with commands from the trailer backup assist system 10 and/or the park assist system 202. These sensor signals and steering commands are processed by a microprocessor 204 of the steering angle controller 200 to operate the steering angle of the steered wheels 64 via the electric steering motor 66. The park assist system 202, according to one embodiment, includes a routine to autonomously steer a vehicle into a selected parking spot, such as in a parallel parking situation. It is contemplated that the park assist system 202 may include the potential to perform one or more types of parking maneuvers, such as parallel parking and perpendicular parking.

Without appropriate arbitration control logic, simultaneous or overlapping steering commands from different steering modules, such as the trailer backup assist system 10 and the park assist system 202, may be commanded to the electric steering motor 66, which could result in a steering angle command or the resulting torque exceeding a predefined limiting value and result in undesirable steering behavior and potential damage to the steering system 62 or other vehicle components or systems. Accordingly, as shown in FIG. 13, the steering angle controller 200 includes an angle-based steering control routine 206 and a torque signal compensation routine 210 stored in memory 208 of the steering angle controller 200 for processing by the microprocessor 204. It is contemplated that the steering angle controller 200 in the alternative or in addition to the microprocessor 204 may include other analog and/or digital circuitry for processing one or more routines. Also, it should be appreciated that the steering angle controller 200 may be a stand-alone dedicated controller or may be a shared controller integrated with other control functions, such as integrated with the controller 28 of the trailer backup assist system 10, and other conceivable onboard or off-board vehicle control systems.

Figure 14:
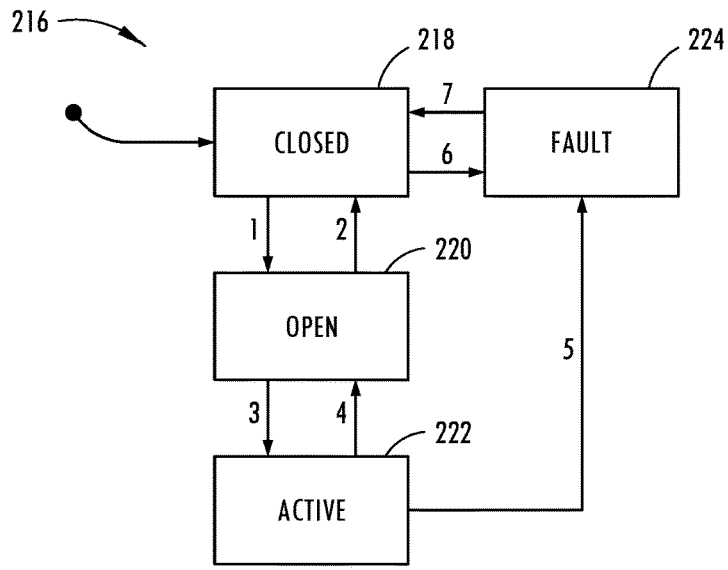
FIG. 14 is a flow chart of conditional transitions of an angle-based steering control routine, showing the order of the lowest numbered transition to the highest.
Figure 15:
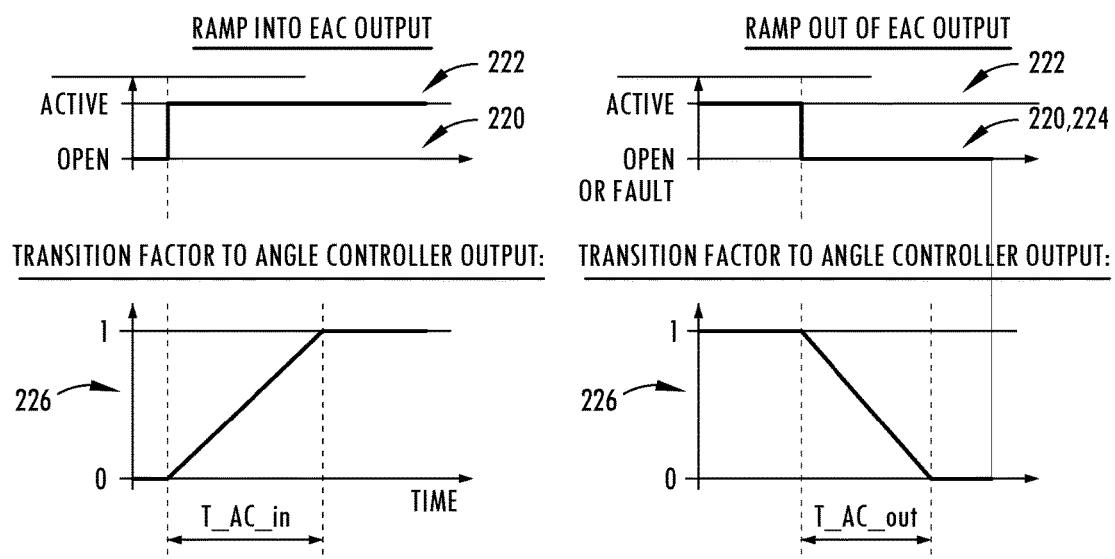
FIG. 15 is a graphical representation of transitions of angle control by the angle-based steering control routine.
Figure 16:
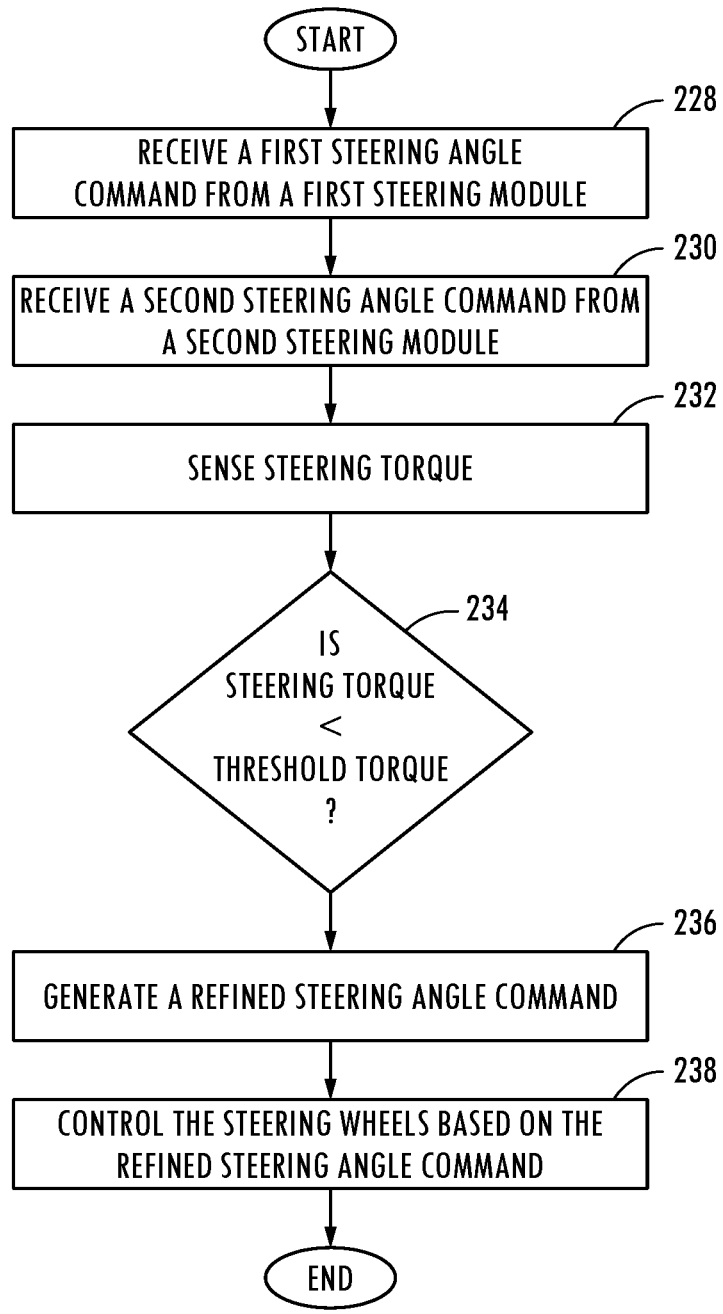
FIG. 16 is flow diagram illustrating a method of operating a steering system using the angle-based steering control routine, according to one embodiment.

Referring now to FIGS. 14-16, the angle-based steering control routine 206 is configured to receive one or more steering angle commands from multiple steering modules and to generate a refined steering angle command for the steering angle controller 200 to operate the steered wheels 64 of the vehicle. To arbitrate and control the steering system 62, the angle-based steering control routine 206 of the steering angle controller 200 is configured to receive the steering angle commands from multiple steering modules and generate a refined steering angle command for the steering angle controller 200 to operate the steered wheels 64 of the vehicle 14. The steering angle controller 200 receives the multiple steering angle commands and generates the refined steering angle command for steering the vehicle 14 based on acceptable steering column torque conditions for the respective steering module. As such, the refined steering angle command may be substantially equal to one of the steering angle commands when the other potential steering angle commands have transitioned to an inactive arbitration state.

As shown in FIG. 14, one embodiment of an arbitration flow chart 216 is depicted, which may be contained in the control logic for each respective autonomous steering module, including the park assist steering module 202 and the trailer backup assist steering module 10. Each steering module may be initiated in the closed condition 218, which prevents the steering module from generating any steering angle commands over the vehicle communication network to the steering angle controller 200. For the respective autonomous steering module to move from the closed condition 218 to the open condition 220, several parameter state requirements must be present, such that the vehicle engine and the steering system 62 are running in acceptable states to receive and execute a command from the respective autonomous steering module. For instance, the vehicle speed must be below a threshold speed, the steering column torque must be below a threshold torque, and the steering column speed must be below a threshold speed. Once in the open condition 220, any change to the vehicle systems, including the vehicle engine and the steering system 62, that would result in an unacceptable state to execute a command will cause the arbitration state to revert to the closed condition 218, preventing any steering angle commands from being generated by the respective steering module.

With further reference to FIG. 14, from the open condition 220, the respective steering module may move to the active condition 222 when, in addition to the necessary parameter conditions being acceptable for the open condition 220, the steering wheel angle is acceptable and a transition factor 226 of the output of the respective steering module is generally equal to zero. In the active condition 222, the respective steering module starts to generate a steering angle command across the vehicle communication network to the steering angle controller 200.

As shown in FIG. 15, one embodiment of a steering module is depicted transitioning between the open and the active conditions 220, 222, which includes a transition factor 226 being applied to the output. More specifically, the transition factor is applied during a period of T_AC_in for the transition to the active condition 222 and a period of T_AC_out for the transition to the open or fault conditions 220, 224 from the active condition 222. The transition factor 226 allows a proportion of the output steering angle command to be transmitted across the vehicle communication network to the steering angle controller 200, so as to avoid abrupt changes in steering angle commands that could cause undesired operation of the vehicle 14. In the case of transitioning to the active condition 222, the transition factor 226 increases linearly during the period of T_AC_in, which thereby provides a gradual implementation of the output steering angle command until a full output steering angle command is communicated to the steering angle controller 200. The transition of one of the steering modules from the open condition 220 to the active condition 222 will cause the remaining steering modules to move to the closed condition 218 or another conceivable an inactive state, which prevents substantial overlap in the output signals from the steering modules. Similarly, in the case of transitioning out of the active condition 222, the transition factor 226 decreases linearly during the period of T_AC_out after moving out of the active condition 222, which thereby provides a gradual reduction of the output steering angle command until no output steering angle command is communicated by the respective steering module. Once the active steering module moves back to the open condition 220, the remaining steering modules may resume the open condition from the inactive state. It is also contemplated that the transition factor may be adjusted non-linearly over the periods identified as T_AC_in and T_AC_out, and it is also conceivable that these periods may be lengthened or shortened to accommodate the desired performance. Also, during operation of a steering module in the active condition 222, a parameter may change and cause the module to move to the fault condition 224, which requires the parameter to be resolved in the closed condition 218 before moving back to the open condition 220. It is contemplated that this transition may be substantially the same as the transition from the active condition 222 to the open condition 220.

The corresponding method for steering angle control, as shown in FIG. 16, includes the general steps 228 and 230 of receiving a first steering angle command from a first steering module and receiving a second steering angle command from a second steering module. In one embodiment, the first and second steering modules may be the trailer backup assist system 10 and the park assist system 202. As explained above, the arbitration logic 216 controls the steering modules to generate steering angle commands when an open state condition 220 of the respective steering module is present. However, it is conceivable that the transition factors may allow one steering module to be still be outputting some steering angle command during the T_AC_out, while another steering module starts to transition into the active condition 222. Ultimately, at step 236 a refined steering angle command may be generated with the received steering angle commands for controlling the steered wheels 64 of the vehicle 14 at step 238, including the pinion angle, based on acceptable steering column torque conditions for the first second steering modules. To determine the acceptable steering column torque conditions, at step 232 a steering torque is sensed by the torque sensor (FIG. 17) and compensate for inertia and off-center mass of the handwheel 68. The refined steering angle command may then be generated when the steering torque is less than a threshold torque, as determined at step 234. Further, the threshold torque is configured to be exceeded when an object is obstructing rotation of the handwheel, as described in more detail herein. The refined steering angle command may be substantially equal the received steering angle command when the other steering modules have transitioned to an inactive state.

Referring again to FIG. 13, to accurately control the steering angle with the refined steering angle command, the steering angle controller 200 may also process a torque signal compensation routine 210 that determines a filtered handwheel acceleration based on the handwheel angle, determines an offset torque based on the filtered handwheel acceleration and handwheel mass properties, and ultimately generates a compensated torque signal based on the offset torque and the input torque signal. The compensated torque signal compensates for inertia and off-center mass of the handwheel 68, whereby a high torque value associated with a sudden change in direction of the pinion angle is reduced in the refined torque signal to prevent the refined torque signal from errantly exceeding a torque threshold, which is indicative of an object obstructing rotation of the handwheel 68 and causes the respective autonomous steering module to be placed in an inactive arbitration state.

Figure 17:
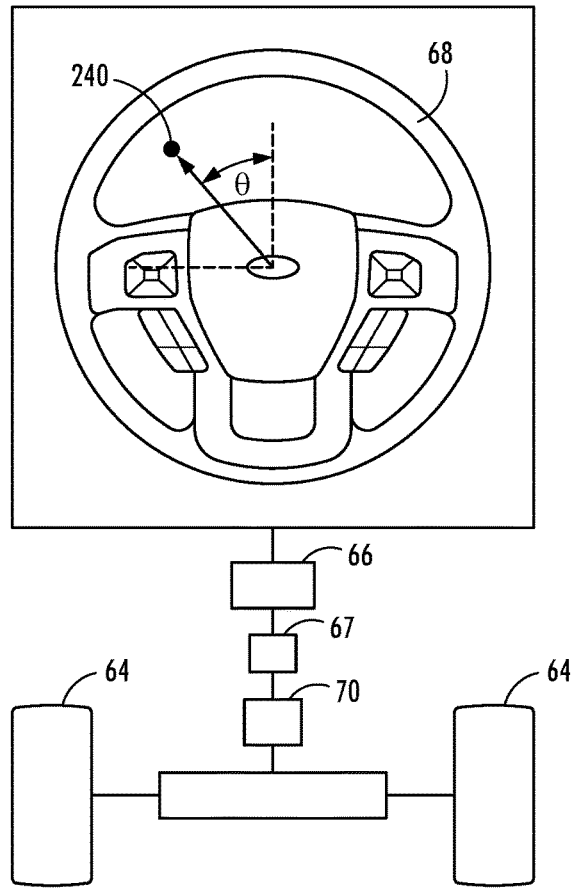
FIG. 17 is schematic diagram of a handwheel operably coupled with steerable wheels of a vehicle, showing angle sensors and a torque sensor.

As shown in FIG. 17, a handwheel 68 is illustrated showing an exemplary mass center offset 240, which can cause spikes in a torque signal generated by a torque sensor on the torsion bar of the steering column, especially when there is a sudden change in direction of the pinion angle. The handwheel angle θ is sensed by the steering wheel angle sensor 67, which in the illustrated embodiment includes a pinion angle sensor 212 (FIG. 13) that senses a pinion angle of the handwheel 68 and a windup angle sensor 214 (FIG. 13) that senses a torsion bar windup angle of the steering column. The torque signal compensation routine 210 generates the handwheel angle θ by combining the pinion angle and the windup angle.

Still referring to FIG. 17, after combining the pinion angle and the windup angle, the handwheel angle is filtered with a high-pass filter and integrated to determine a filtered handwheel acceleration value. The steering angle controller may then determine an offset torque based on the filtered handwheel acceleration. More specifically, the offset torque may be calculated with the following equation:

$$T_{OFFSET} = d^* \sin(SWA + \theta)$$

Where, d is the distance from the rotational point of the handwheel to its center of gravity, θ is the angle about the rotation point between vertical and the center of gravity, and SWA is the filtered handwheel acceleration.

Figure 18:
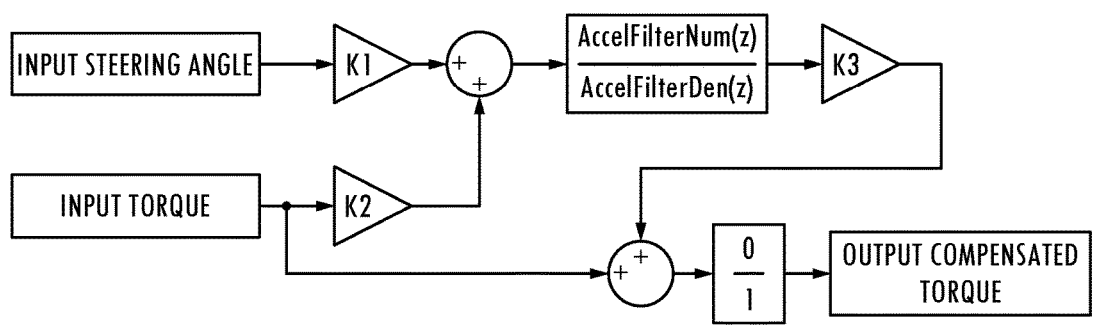
FIG. 18 is a block diagram illustrating signal flow of one embodiment of the steering system.

As shown in FIG. 18, the offset torque calculates instantaneous rotational inertia of the handwheel 68 for applying it to the input torque signal to define a refined torque signal that compensates for inertia and off-center mass of the handwheel 68. The refined torque signal is passed through a low-pass filter prior to exiting the torque signal compensation routine and operating the pinion angle with the refined torque signal. The high torque value associated with a sudden change in direction of the pinion angle is reduced in the refined torque signal to prevent the refined torque signal from errantly exceeding a torque threshold. The steering angle controller 200 may also be configured to stop autonomous control of the pinion angle when the refined torque signal exceeds a threshold torque. The threshold torque value may be set to be exceeded when an object is obstructing rotation of the handwheel 68, such as a driver grasping the handwheel with the intent to take direct, manual control of the steering system 62.

Figure 19:
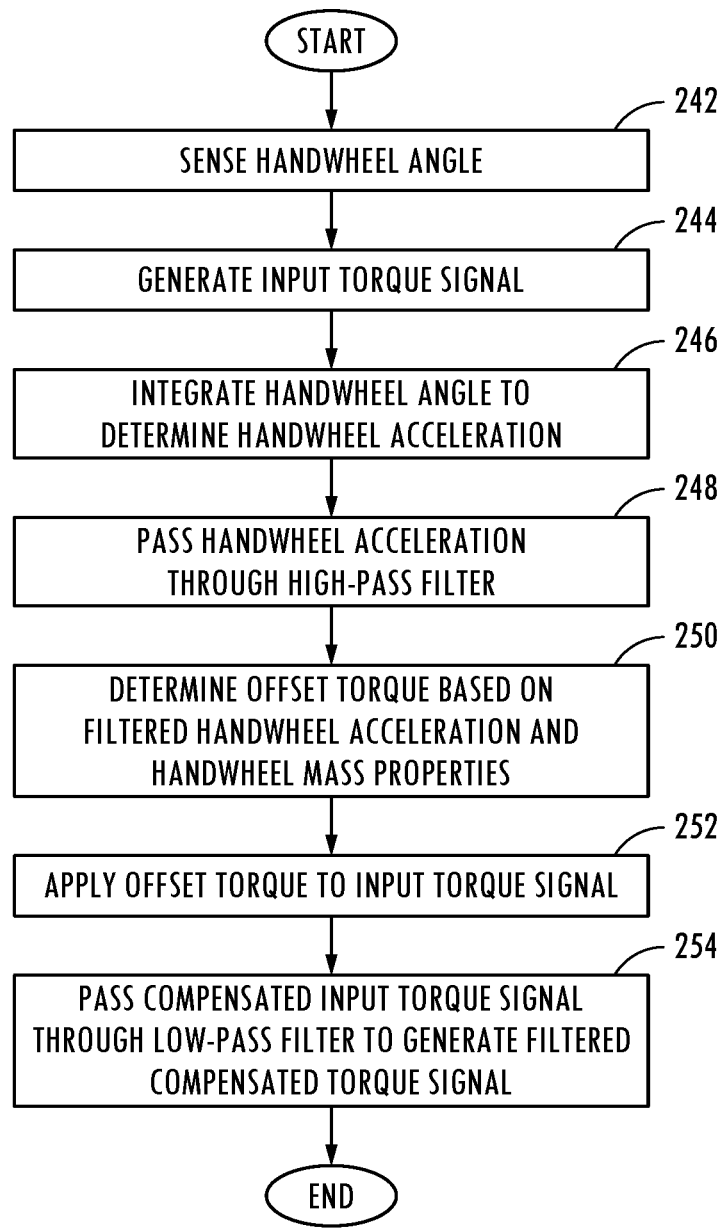
FIG. 19 is a flow diagram illustrating a method of operating a steering system using a torque signal compensation routine, according to one embodiment.
Figure 20A:
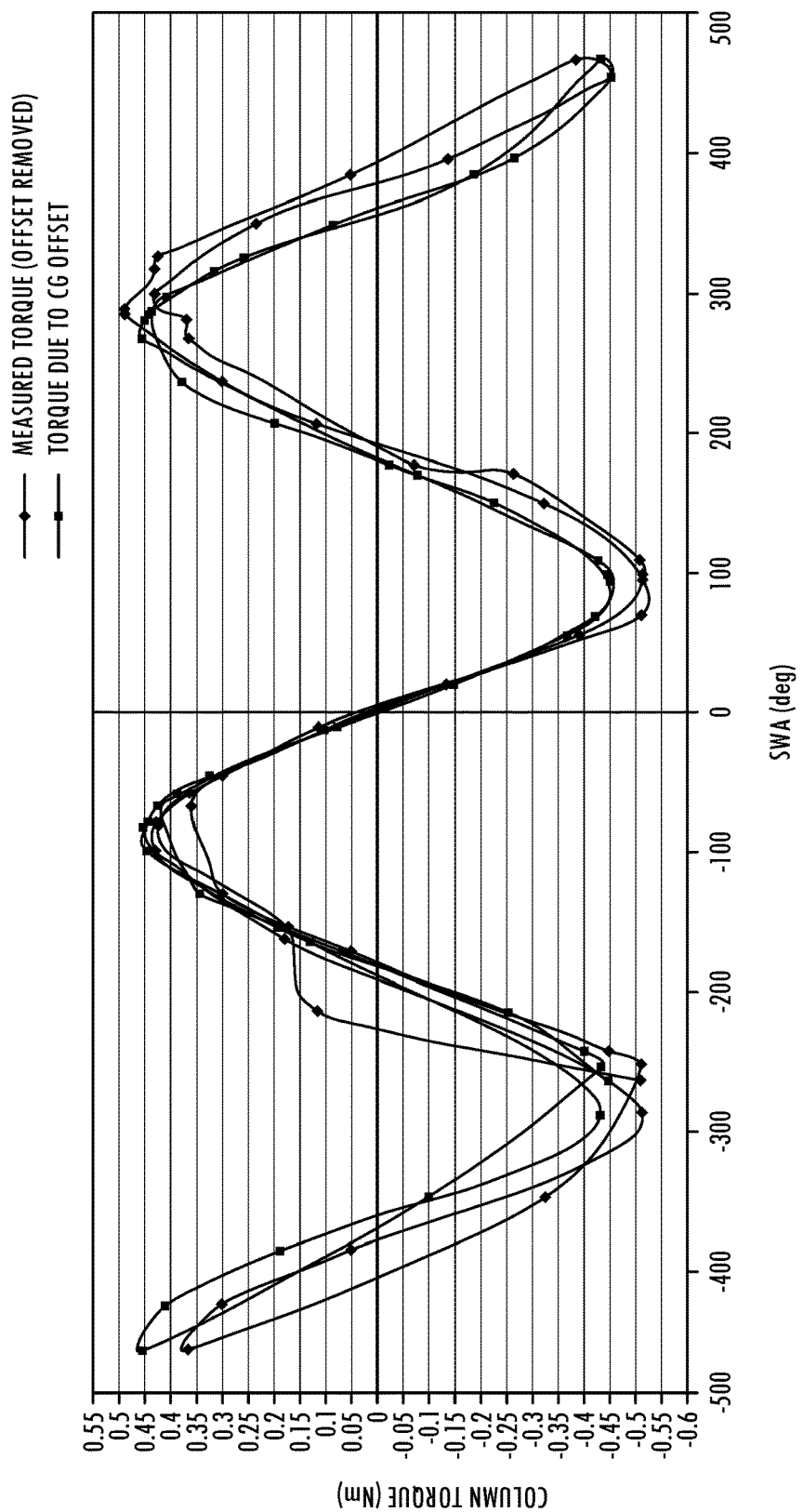
FIGS. 20A-B are graphical representations of an exemplary torque signal compensated with a torque signal compensation routine.
Figure 20B:
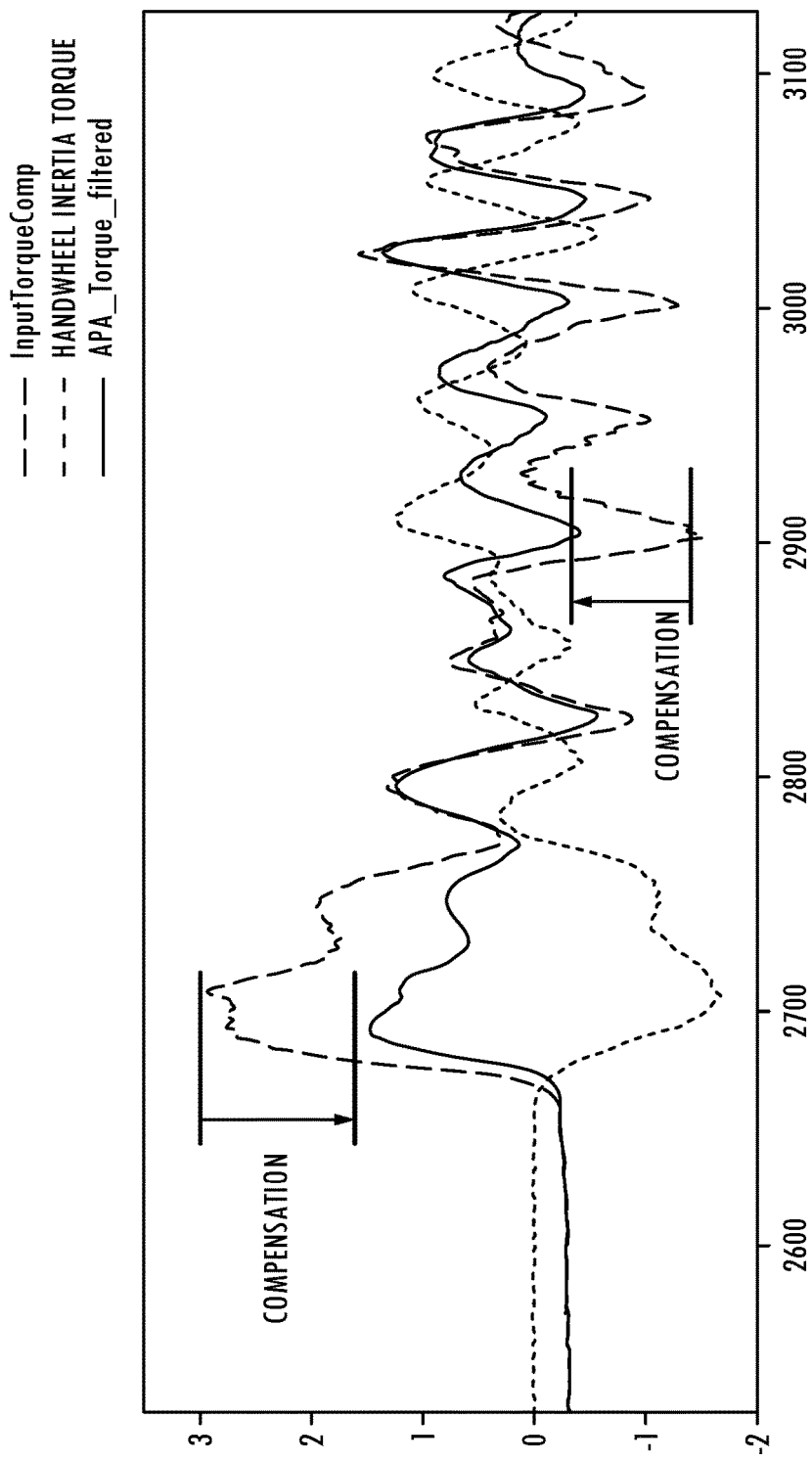

The corresponding method of operating the torque signal compensation routine 210 is illustrated in FIG. 19. At step 242 in the method, the handwheel angle is the angle sensed by combining a sensed pinion angle and a sensed torsion bar windup angle. At step 244, a steering command is generated, such as by the angle-based steering control routine 206, which includes generating an input torque signal. As described above, the torque signal compensation routine 210 integrates the handwheel angle to determine a handwheel acceleration, at step 246, and then passes the handwheel acceleration through a high-pass filter to determine a filtered handwheel acceleration, at step 248. And in turn, an offset torque is determined based on the filtered handwheel acceleration and handwheel mass properties at step 250. A filtered compensated torque signal is then generated with the offset torque being applied to the input torque signal step 252 and then filtered with a low-pass filter at step 254, which compensates for inertia and off-center mass of the handwheel 68. The autonomous control of the handwheel angle is then performed, such as by the trailer backup assist system 10, based on the filtered compensated torque signal. As shown in FIG. 20A, the filtered compensated torque signal is shown in comparison with the measured torque having the offset torque removed, which are the signals at steps 254 and 252 (FIG. 19), respectively. Further, as shown in FIG. 20B, the filtered compensated torque signal is shown comparison with the input torque and the offset torque, which illustrates how the compensated torque signal compensates for inertia and off-center mass of the handwheel 68 prevents the torque signal from errantly exceeding a torque threshold, which is indicative of an object obstructing rotation of the handwheel 68 and causes the respective autonomous steering module to be placed in an inactive arbitration state, such as the fault condition 224.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle steering system for a vehicle, comprising:
   a sensor sensing a handwheel angle;

an autonomous steering module generating an input torque signal, wherein the autonomous steering module includes a trailer backup assist controller for generating a steering command for guiding a trailer connected to the vehicle in reverse, wherein the trailer backup assist controller receives a hitch angle between the trailer and the vehicle sensed by a hitch angle sensor and generates the steering command based on the sensed hitch angle to generate the input torque signal to steer the vehicle when the vehicle is driving in reverse; and a steering angle controller for determining a handwheel acceleration based on the handwheel angle, determining an offset torque based on the handwheel acceleration, and generating a compensated torque signal based on the offset torque and the input torque signal.

2. The vehicle steering system of claim 1, wherein the sensor includes a first sensor sensing a pinion angle and a second sensor sensing a torsion bar windup angle, and wherein the handwheel angle is based on the pinion angle and the windup angle, and wherein the steering angle controller autonomously controls steering of the vehicle based on the compensated torque signal and stops autonomous steering of the vehicle when the compensated torque signal exceeds a torque threshold.

3. The vehicle steering system of claim 1, wherein the compensated torque signal is configured to compensate for inertia and off-center mass of a handwheel.

4. The vehicle steering system of claim 1, wherein the sensor includes a first sensor sensing a pinion angle and a second sensor sensing a torsion bar windup angle, and wherein the handwheel angle is based on the pinion angle and the windup angle, and wherein a high torque value associated with a sudden change in direction of the pinion angle is reduced in the compensated torque signal to prevent the compensated torque signal from errantly exceeding a torque threshold.

5. The vehicle steering system of claim 1, wherein the handwheel acceleration is filtered.

6. The vehicle steering system of claim 5, wherein the compensated torque signal is passed through a low-pass filter prior to operating the handwheel with the compensated torque signal, and wherein the handwheel acceleration is filtered with a high-pass filter.

7. A vehicle steering system for a vehicle, comprising:
a sensor sensing a handwheel angle;
a trailer backup assist controller for generating a steering command for guiding a trailer connected to the vehicle in reverse, the steering command generating an input torque signal, wherein the steering command is based on a hitch angle between the vehicle and trailer as sensed by a hitch angle sensor to generate the input torque signal to steer the vehicle when the vehicle is driving in reverse; and
a steering angle controller for determining a handwheel acceleration based on the handwheel angle, determining an offset torque based on the handwheel acceleration, and generating a compensated torque signal based on the offset torque and the input torque signal.

8. The vehicle steering system of claim 7, wherein the handwheel acceleration is filtered, and wherein the compensated torque signal is passed through a low-pass filter prior to operating the handwheel angle with the compensated torque signal, and wherein the handwheel acceleration is filtered with a high-pass filter.

9. The vehicle steering system of claim 7, wherein the sensor includes a first sensor sensing a pinion angle and a second sensor sensing a torsion bar windup angle, and wherein the handwheel angle is based on the pinion angle and the windup angle.

10. The vehicle steering system of claim 9, wherein a high torque value associated with a sudden change in direction of the pinion angle is reduced in the compensated torque signal to prevent the compensated torque signal from errantly exceeding a torque threshold.

11. The vehicle steering system of claim 7, wherein the steering angle controller autonomously controls steering of the vehicle based on the compensated torque signal and stops autonomous steering of the vehicle when the compensated torque signal exceeds a torque threshold.

12. A method for steering a vehicle connected to the trailer in reverse, comprising:
sensing an angle of a handwheel;
sensing a hitch angle between a trailer and the vehicle;
generating a steering command to steer the vehicle for guiding the trailer in reverse based on the sensed hitch angle, the steering command generating an input torque signal;
determining a handwheel acceleration based on the angle;
determining an offset torque based on the handwheel acceleration; and
generating a compensated torque signal based on the offset torque and the input torque signal to compensate for inertia and off-center mass of the handwheel.

13. The method of claim 12, wherein the compensated torque signal is passed through a low-pass, and wherein the handwheel acceleration is filtered with a high-pass filter.

14. The method of claim 13 further comprising:
autonomously operating a handwheel angle based on the filtered compensated torque signal and ceasing autonomous operation of the handwheel angle when the compensated torque signal exceeds a threshold torque.

15. The method of claim 12, further comprising:
autonomously operating the angle of the handwheel based on the compensated torque signal.

16. The method of claim 12, wherein sensing the angle of the handwheel includes sensing a pinion angle and sensing a torsion bar windup angle, and wherein the angle of the handwheel is based on the pinion angle combined with the torsion bar windup angle.

17. The method of claim 12, wherein a high torque value associated with a sudden change in direction of a pinion angle is reduced in the compensated torque signal to prevent the compensate torque signal from errantly exceeding a torque threshold.

18. The method of claim 14, wherein the threshold torque value is configured to be exceeded when an object is obstructing a predicted change to the handwheel angle.

* * * * *